United States Patent
Chosokabe

(10) Patent No.: US 8,005,255 B2
(45) Date of Patent: Aug. 23, 2011

(54) CONTENT SELECTING METHOD AND CONTENT SELECTING APPARATUS

(75) Inventor: Yoshihiro Chosokabe, Nagano (JP)

(73) Assignee: Sony Corporation (JP)

( * ) Notice: Subject to any disclaimer, the term of this patent is extended or adjusted under 35 U.S.C. 154(b) by 1020 days.

(21) Appl. No.: 11/641,554

(22) Filed: Dec. 19, 2006

(65) Prior Publication Data

US 2007/0172131 A1 Jul. 26, 2007

(30) Foreign Application Priority Data

Dec. 20, 2005 (JP) ................ P2005-366510

(51) Int. Cl.
*G06K 9/00* (2006.01)
(52) U.S. Cl. ..................................... 382/100
(58) Field of Classification Search .............. 382/100
See application file for complete search history.

(56) References Cited

U.S. PATENT DOCUMENTS

| 7,231,389 B2 * | 6/2007 | Yamane et al. | 707/5 |
| 7,571,183 B2 * | 8/2009 | Renshaw et al. | 707/102 |
| 7,630,282 B2 * | 12/2009 | Tanaka et al. | 369/47.16 |
| 2006/0202994 A1 | 9/2006 | Chevallier et al. | |
| 2008/0222128 A1 * | 9/2008 | Yoshida et al. | 707/5 |

FOREIGN PATENT DOCUMENTS

| JP | 08137902 A | 5/1996 |
| JP | 08263255 A | 10/1996 |
| JP | 10011463 A | 1/1998 |
| JP | 2000-207415 A | 7/2000 |
| JP | 2001265812 A | 9/2001 |
| JP | 2005-010771 | 1/2005 |
| JP | 2007-525779 | 9/2007 |
| WO | 2005006163 A2 | 1/2005 |

OTHER PUBLICATIONS

Office Action from Japanese Application No. 2005-366510, dated Sep. 30, 2010.
Office Action from Japanese Application No. 2005-366510, dated Feb. 3, 2011.

* cited by examiner

*Primary Examiner* — Aaron W Carter
*Assistant Examiner* — Hadi Akhavannik
(74) *Attorney, Agent, or Firm* — Lerner, David, Littenberg, Krumholz & Mentlik, LLP

(57) ABSTRACT

A content selecting method allows a target content to be selected as desired from a plurality of contents. The method includes transforming a three-dimensional image into a content selection image made up of a two-dimensional image viewed from a predetermined point of view, the three-dimensional image including content indicators each representing one of a plurality of contents, each of the content indicators being designated by a plurality of three-dimensional coordinates made of first, second and third impression item values obtained by converting three items representative of impressions of each content into numerical terms; displaying the content selection image; and discriminating a target content selected from the plurality of contents in accordance with the position of a selected target part on the content selection image and with the positions of the plurality of content indicators on the content selection image.

15 Claims, 15 Drawing Sheets

FIG. 2

| SPEED | IMPRESSION OF BEING SLOW ←→ IMPRESSION OF BEING FAST |
|---|---|
| TONE | IMPRESSION OF BEING ANALOG ←→ IMPRESSION OF BEING DIGITAL |
| AGE | IMPRESSION OF BEING OLD ←→ IMPRESSION OF BEING NEW |

FIG. 3

C:¥MP3¥AAA¥ABC.mp3 [tab] all songs [tab] my band [tab] 123 [tab] 50 [tab] 25 [LINE FEED CODE]

SS — AL — AT — SP — EL — NE

25

F I G . 7
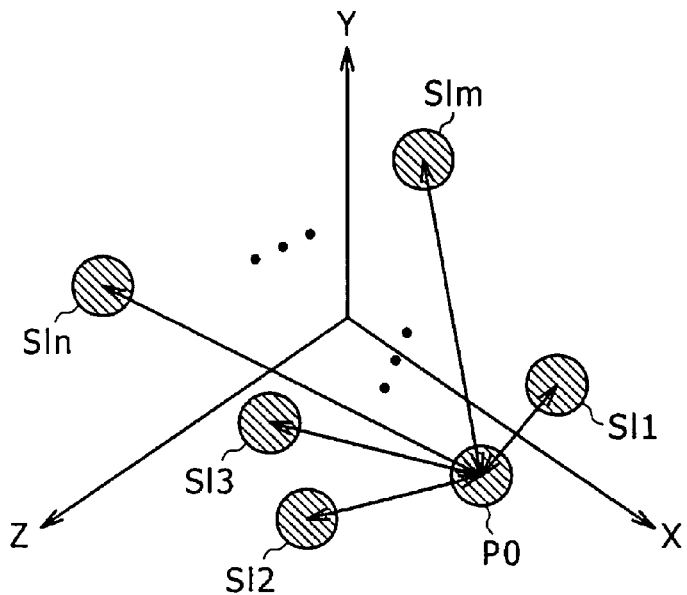
F I G . 8
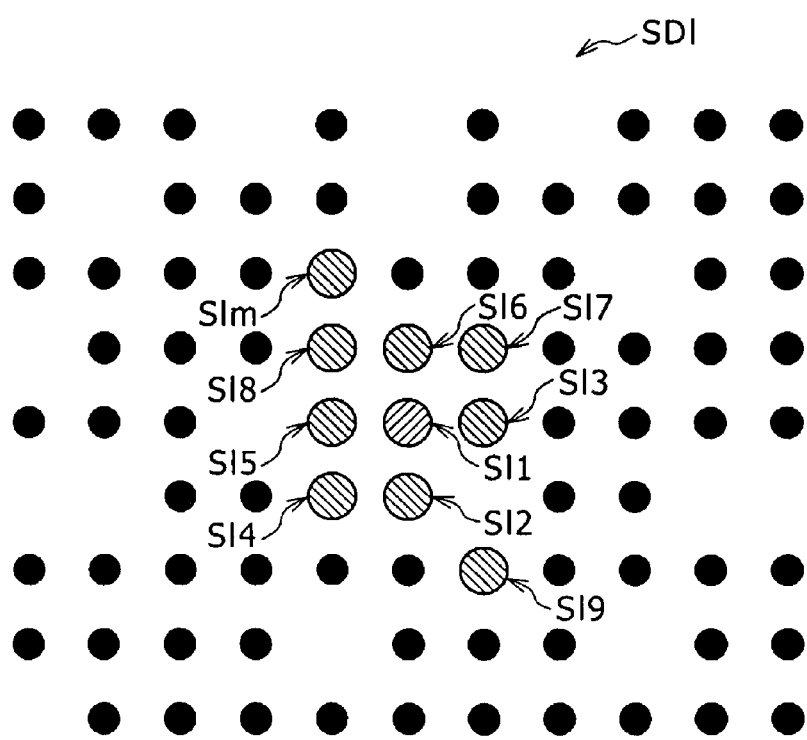

FIG.10

| | Play List A | ← PLI |
|---|---|---|
| | SELECTION STANDARD IMPRESSION VALUES | ← SSI |
| 1 | C:¥MP3¥AAA¥ABC.mp3 | ← SS |
| 2 | Y:¥MP3¥RCP¥BTW.mp3 | |
| 3 | C:¥MP3¥ABZ¥YHA.mp3 | |
| ⋮ | ⋮ | |
| N | Y:¥MP3¥EHE¥NER.mp3 | |

50

CONTENT SELECTING METHOD AND CONTENT SELECTING APPARATUS

CROSS-REFERENCE TO RELATED APPLICATIONS

The present application claims priority from Japanese Patent Application No. JP 2005-366510 filed on Dec. 20, 2005, the disclosure of which is hereby incorporated by reference herein.

BACKGROUND OF THE INVENTION

1. Field of the Invention

The present invention relates to a content selecting method and a content selecting apparatus. More particularly, the invention relates to a data recording and reproducing apparatus for recording and reproducing song data.

2. Description of the Related Art

In the past, song searching apparatuses generally created impression values each made up of two-dimensional data numerically representing the impressions of a plurality of songs. Such impression values were each displayed as a point on a two-dimensional image. The song searching apparatus typically allowed users to select individual points on the two-dimensional image as indicators representative of songs (e.g., Japanese Published Unexamined Patent Application No. 2005-10771, pp. 14-15, FIG. 7).

Because the traditional song searching apparatus represented the impressions of a plurality of songs as the impression values formed by two-dimensional data, it was difficult to let the impressions of given songs be adequately recognized merely from the corresponding points on the two-dimension image. That is, the typical song searching apparatus had difficulty allowing users to choose precisely the contents of preferred impressions.

SUMMARY OF THE INVENTION

The present invention has been made in view of the above circumstances and provides a content selecting method and a content selecting apparatus for allowing the user to select contents of preferred impressions easily and precisely.

In carrying out the invention and according to one embodiment thereof, a content selecting method for allowing a target content to be selected as desired from a plurality of contents includes transforming a three-dimensional image into a content selection image made up of a two-dimensional image viewed from a predetermined point of view; displaying the content selection image; and discriminating a target content selected from the plurality of contents in accordance with the position of a selected target part on the content selection image and with the positions of the plurality of content indicators on the content selection image. The three-dimensional image includes content indicators each representing one of a plurality of contents. Each of the content indicators is designated by a plurality of three-dimensional coordinates made of first, second, and third impression item values obtained by converting three items representative of impressions of each content into numerical terms.

According to an embodiment of the present invention, as outlined above, the content selection image is presented as the two-dimensional image representative of the three-dimensional image including the content indicators each designated by three-dimensional coordinates made of the first, the second, and the third impression item values obtained by converting three items representative of the impressions of each content into numerical terms. Given the three-dimensional positions of the content indicators in the content selection image, the user can intuitively recognize selectable contents of preferred impressions. When allowed simply to select as a target part the content with the favored impressions, the user can discriminate from that part the content of the impressions closest to those preferred.

That is, when any one of a plurality of contents is arranged to be selected according to an embodiment of the present invention, a three-dimensional image is transformed into a content selection image made up of a two-dimensional image viewed from a predetermined point of view. The three-dimensional image includes content indicators each representing one of a plurality of contents. Each of the content indicators is designated by a plurality of three-dimensional coordinates made of first, second, and third impression item values obtained by converting three items representative of impressions of each content into numerical terms. With the content selection image displayed on a display device, the target content selected from the plurality of contents is discriminated in accordance with the position of a selected target part on the content selection image and with the positions of the plurality of content indicators on the content selection image. Given the three-dimensional positions of the content indicators in the content selection image, the user can intuitively determine selectable contents of preferred impressions. When allowed simply to select as a target part the content with the favored impressions, the user can discriminate from that part the content of the impressions closest to those preferred. According to an embodiment of the invention, it is thus possible to implement a content selecting method and a content selecting apparatus for allowing the user to select the contents of preferred impressions easily and accurately.

BRIEF DESCRIPTION OF THE DRAWINGS

FIG. 2 is a schematic view showing three items indicative of the impressions of songs;

FIG. 3 is a schematic view showing a structure of song analysis information;

FIG. 7 is a schematic view showing how songs are selected;

FIG. 8 is a schematic view showing how the selected song and candidate songs are presented;

FIG. 10 is a schematic view showing a structure of a play list;

DETAILED DESCRIPTION

Preferred embodiments of the present invention will now be described with reference to the accompanying drawings.

Figure 1:
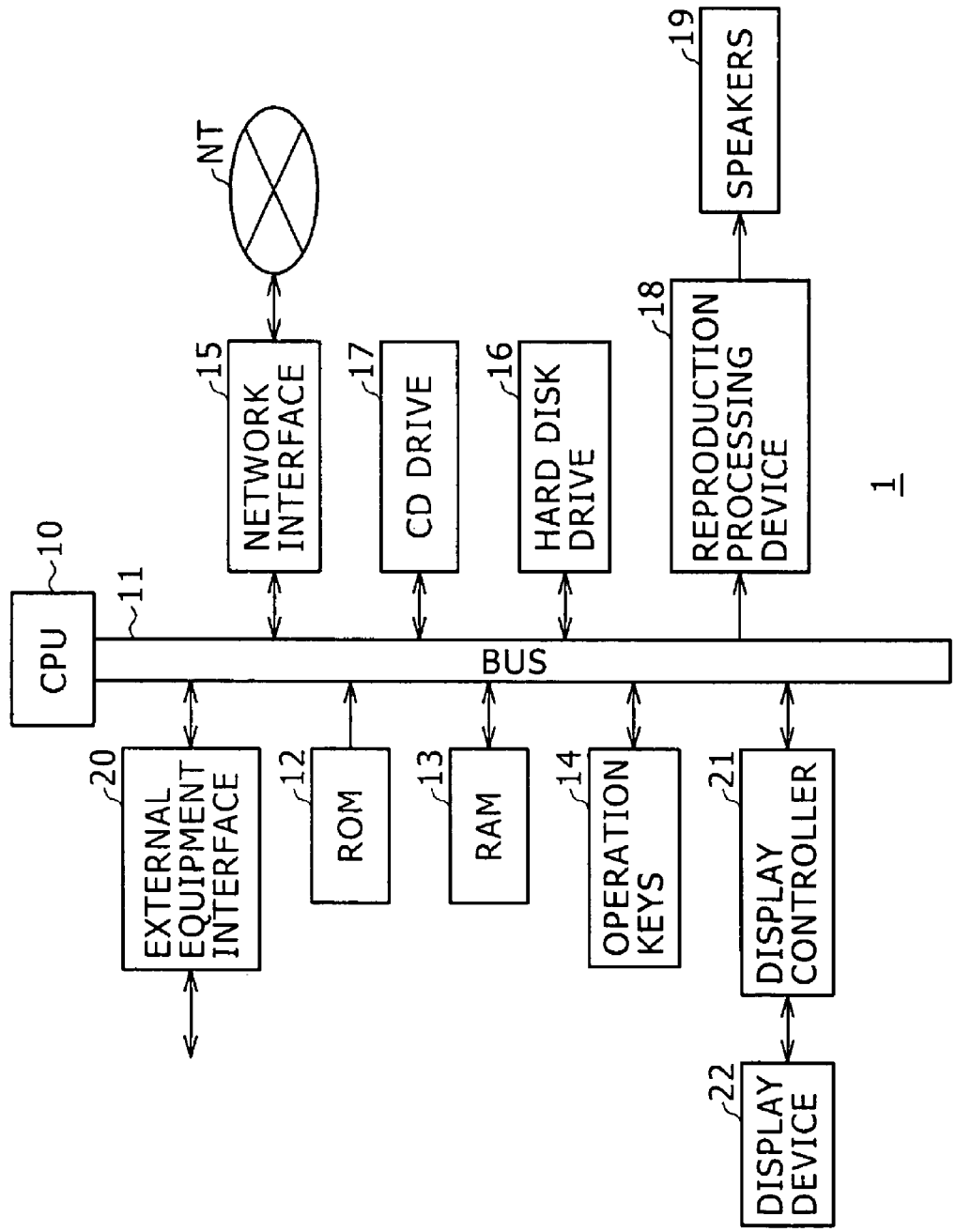
FIG. 1 is a block diagram showing a circuit structure of a data recording and reproducing apparatus according to an embodiment of the present invention.

In FIG. 1, reference numeral 1 stands for a data recording and reproducing apparatus. A CPU (Central Processing Unit) 10 reads various programs such as a song selection program and a list modification program from a ROM (Read-Only Memory) 12, loads the retrieved programs into a RAM (Random Access Memory) 13, and runs the loaded programs for overall control and for execution of diverse processes. Illustratively, a user may manipulate operation keys 14 furnished typically on the enclosure of the data recording and reproducing apparatus 1 in order to input a request to have song data delivered from a song delivery server (not shown) on a network NT. In such a case, the apparatus 1 sends a signal constituting a song data delivery request to the song delivery server through a network interface 15. When the song data is sent from the song delivery server over the network NT, the CPU 10 receives the song data through the network interface 15 and records the received data to a hard disk drive 16. Together with the requested song data, the song delivery server sends to the data recording and reproducing apparatus 1 such song-related information as the title of the song in question, the name of the artist involved, the title of the album containing the song, the name of the genre to which the song belongs, and song identification information for uniquely identifying the song. Thus when making use of song data delivery services of the song delivery server, the CPU 10 receives the song-related information along with the song data coming from the server through the network interface 15, and records the received information also to the hard disk drive 16.

If a song data recording command is input by the user through the operation keys 14 with a CD (Compact Disc) loaded in a CD drive 17, the CPU 10 reads the song data from a song data recording area of the CD and records the retrieved song data to the hard disk drive 16. The data recording surface of the CD has a management data recording area in addition to the song data recording area. The management data recording area retains data for managing the song data recorded in the song data recording area. Such management data is called a TOC (Table Of Contents) that includes the playing times of individual songs, the order in which the songs are to be reproduced, and the reproduction starting positions of the songs in the song data recording area. Upon retrieval of the song data from the song data recording area of the CD in the CD drive 17, the CPU 10 also reads the management data from the management data recording area of the CD. Based on the retrieved management data, the CPU 10 creates management information specific to the CD in question and sends the created management information through the network interface 15 to a disk information delivery server (not shown) on the network NT. When the disk information delivery server returns as disk information the song-related information about each of a plurality of songs recorded on the CD, the CPU 10 receives the disk information through the network interface 15 and records the received disk information to the hard disk drive 16. In this manner, the CPU 10 has a plurality of songs acquired and retained in data form from the song delivery sever on the network NT.

If the user inputs a reproduction command through the operation keys 14 to reproduce song data from the hard disk drive 16, the CPU 10 retrieves the song data in question from the hard disk drive 16 and forwards the retrieved song data to a reproduction processing device 18. In turn, the reproduction processing device 18 subjects the song data supplied from the CPU 10 to digital processing such as decoding, followed by such analog processing as digital-to-analog conversion and amplification. The resulting song signal is sent from the reproduction processing device 18 to speakers 19 for music output based on the song signal. It is also possible to connect the data recording and reproducing apparatus 1 with external equipment including a portable player (not shown) through an external equipment interface 20 such as the USB (Universal Serial Bus) interface. Thus when a song data transfer command is input by the user through the operation keys 14, the CPU 10 reads the song data in question from the hard disk drive 16 and transfers the retrieved song data to the external equipment through the external equipment interface 20 so that the external equipment may record the transferred song data.

The CPU 10 sends to a display controller 21 display-ready data derived from the execution of various programs read from the ROM 12 (e.g., the programs typically cover acquisition, reproduction, recording, and transfer of song data). In turn, the display controller 21 causes a display device 22 to display screens based on the display-ready data supplied from the CPU 10. In this manner, the CPU 10 allows the user visually to recognize the screens regarding the acquisition, reproduction, recording, and transfer of song data.

Where the above structure of the data recording and reproducing apparatus 1 is in place, the CPU 10 further analyzes the song data recorded on the hard disk drive 16 using frequency analysis and other techniques. Based on the result of such analyses, the CPU 10 may acquire a first, a second, and a third impression value representing three typical items of impression such as the speed, tone, and age regarding each song. Of the three items representative of the song-derived impressions, as shown in FIG. 2, the speed item indicates whether a given song is perceived to be slow or fast. The smaller the speed item value, the slower the song is perceived; the larger the value, the faster the song is perceived. The tone item indicates whether a given song is perceived to be analog or digital. The smaller the tone item value, the more analog the song is perceived; the larger the value, the more digital the song is perceived. The age item indicates whether a given song is perceived to be old or new. The smaller the age item value, the older the song is perceived; the larger the value, the newer the song is perceived.

After acquiring the first, the second, and the third impression values about each song based on the song data recorded on the hard disk drive 16, the CPU creates song analysis information 25 about each song using these values as well as the song-related information involved, as shown in FIG. 3. The song analysis information 25 about each song is constituted by song identification information SS for identifying the analyzed song data, the title of the album AL containing the song in question, the name of the artist AT involved, the first impression item value SP numerically representing the speed of the song, the second impression item value EL numerically denoting the tone of the song, and the third impression item value NE numerically indicating the age of the song. The song identification information SS as part of the song analysis information 25 includes the path indicative of the position where the analyzed song data is recorded. The song identification information SS is also part of the song-related information. After creating such song analysis information, the CPU 10 records the created information to the hard disk drive 16.

Figure 4:
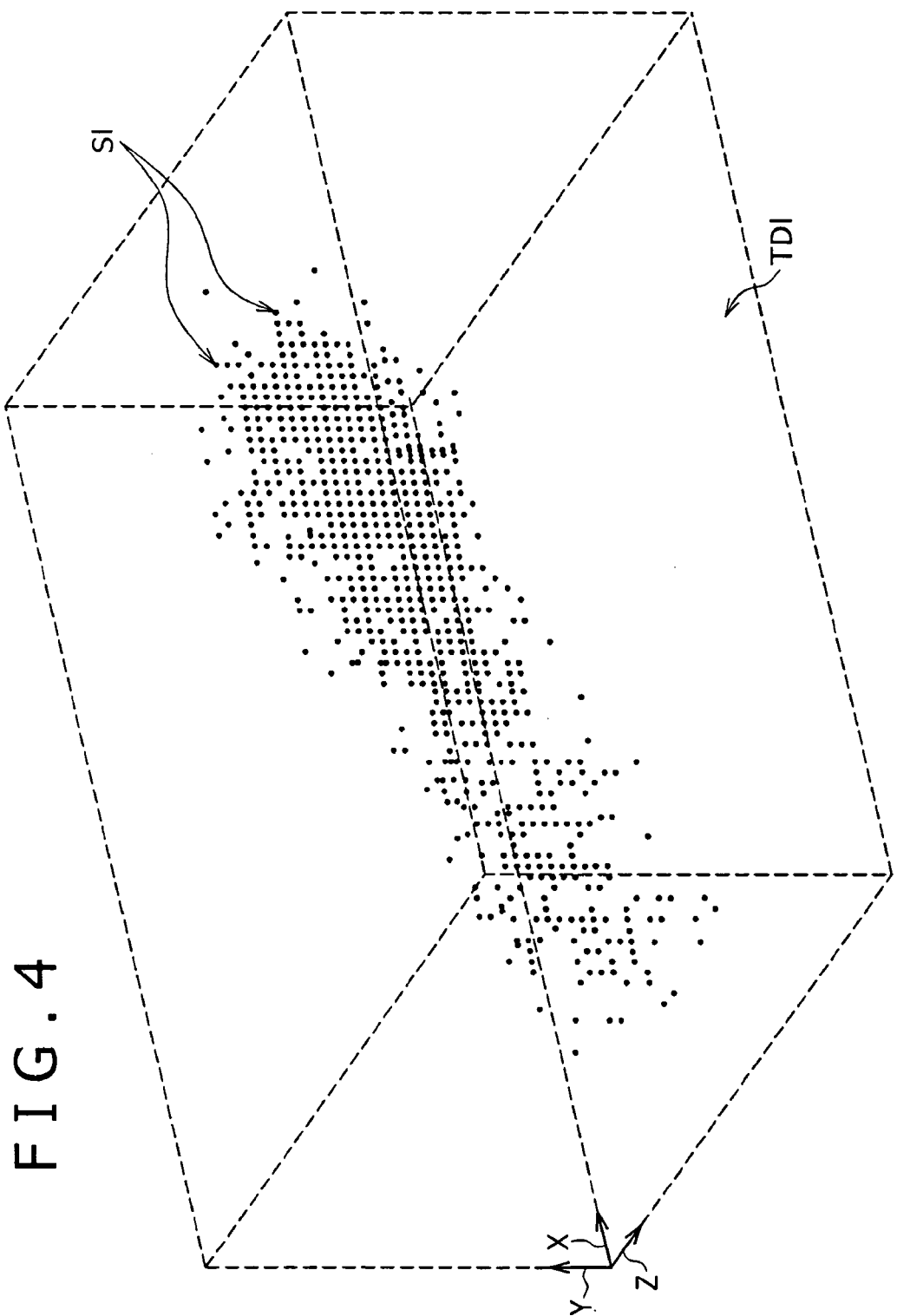
FIG. 4 is a schematic view showing a structure of a three-dimensional image.

If, with the above arrangements in place, the user inputs a song selection request through the operation keys 14, then the CPU 10 reads all song analysis information 25 recorded on the hard disk drive 16. As shown in FIG. 4, the CPU 10 establishes three-dimensional coordinates designating a set of the first through the third impression item values SP, EL, and NE included in the song analysis information 25 about each of the recorded songs. The coordinates are defined by three axes (X, Y, and Z) intersecting one another perpendicularly and by the point of intersection of the axes (i.e., origin). Illustratively, the CPU 10 may have the first impression item value SP placed on the X axis, the second impression item value EL on the Y axis, and the third impression item value NE on the Z axis. A three-dimensional image TDI is then formed by star-like (or point-shaped) song indicators SI each representing a song. The CPU 10 transforms the three-dimensional image TDI illustratively into a two-dimensional song selection image obtained by initially projecting the 3D image onto a two-dimensional plane (X-Y plane in this example) from a given point of view along the Z axis (the point is called the initial point of view). This is a two-dimensional image of which the line of sight from the initial point of view is perpendicular to the X-Y plane.

In the three-dimensional image TDI, the first, the second, and the third impression item values SP, EL, and NE are designated by three-dimensional coordinates. As such, the three-dimensional coordinate values properly express the three items of impressions about each song. Each of the three-dimensional coordinate values defining the impressions of songs is represented by the song identifier SI in the three-dimensional image TDI. As a result, the song identifiers SI identifying songs of similar impressions are located close to one another in the image TDI. Where the first, the second, and the third impression item values SP, EL, and NE are used as the three-dimensional coordinates of the three-dimensional image TDI framed by the three perpendicularly intersecting axes, the X axis stands for the speed item, the Y axis for the tone item, and the Z axis for the age item. In the three-dimensional image TDI, the smaller the value on the X axis, the slower the song in question is perceived; the larger the value on the X axis, the faster the song is perceived. Likewise, the smaller the value on the Y axis, the more analog the song is perceived; the larger the value on the Y axis, the more digital the song is perceived. The smaller the value on the Z axis, the older the song is perceived; the larger the value on the Z axis, the newer the song is perceived. As a result, the song identifiers SI denoted by the three-dimensional coordinates representative of the first, the second, and the third impression item values SP, EL, and NE allow the user intuitively to get the impressions of the songs in accordance with the identifier positions inside the three-dimensional image TDI.

Figure 5:
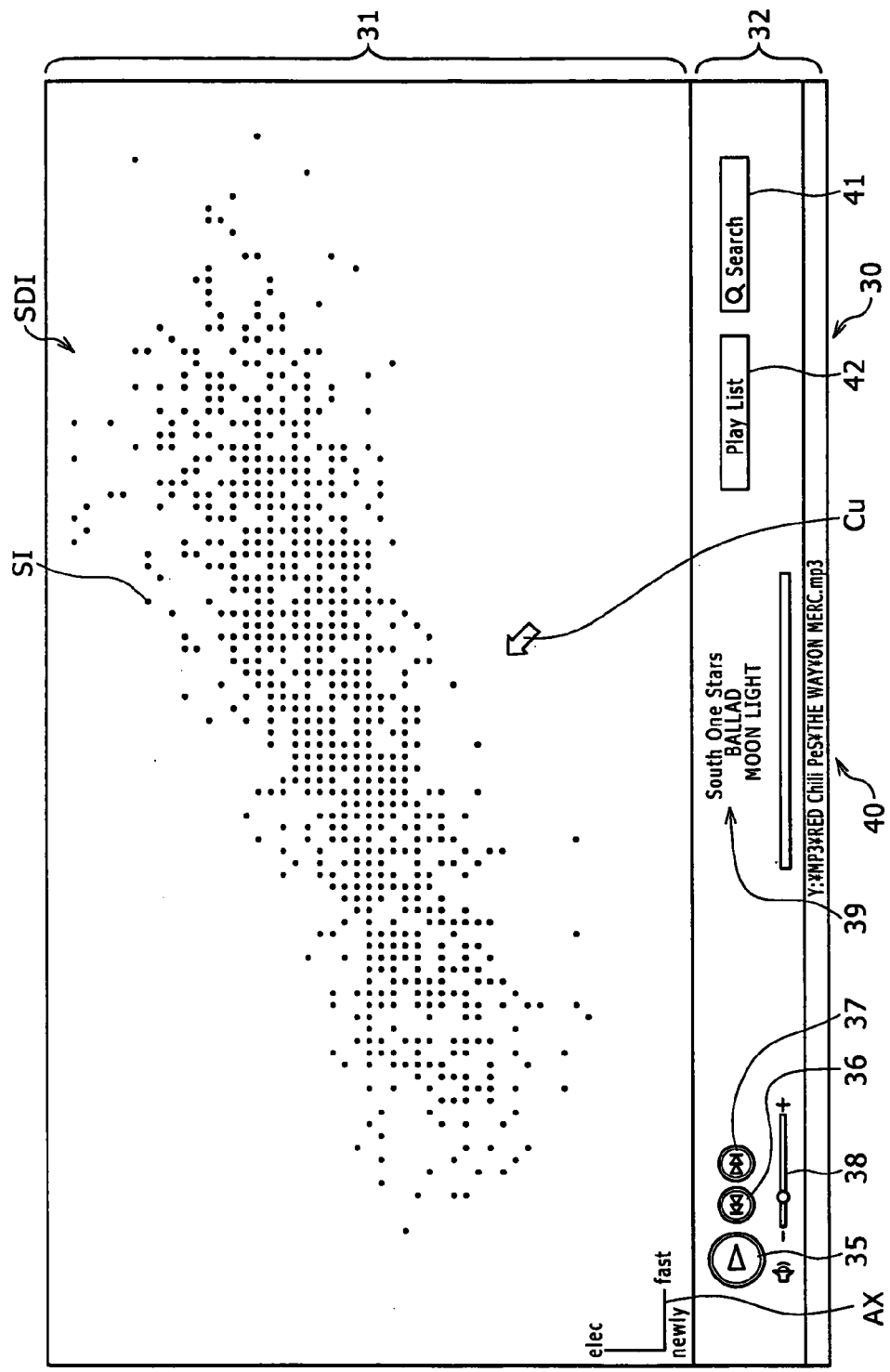
FIG. 5 is a schematic view showing a structure of a song search screen.

The CPU 10 transforms the three-dimensional image TDI described above into the song selection image in two-dimensional form. At this point, the CPU 10 creates song search screen data based on the song selection image and forwards the song search screen data thus created to the display device 22 through the display controller 21. The display controller 21 causes the display device 22 to display a song search screen 30 based on the song search screen data as shown in FIG. 5. The song search screen 30 has a song selection area 31 and an operation area 32. The song selection area 31 displays the song selection image SDI in two-dimensional form. Also shown in the song selection area 31 is a perspective axis image AX obtained as part of the three-dimensional image TDI by projecting the three axes defining the initial image TDI onto an X-Y plane from the initial point of view. Further shown in the song selection area 31 is a cursor Cu which appears overlaid on the song selection image SDI and which may be used to point to and designate desired song identifiers SI on the image SDI. In addition, the perspective axis image AX has characters "fast" displayed at the tip of its X axis, "elec" at the tip of its Y axis, and "newly" at the tip of its Z axis, whereby the impressions of a given song are defined. The farther from the point of origin along the X axis, the faster the song is perceived (hence the indication "fast"); the farther along the Y axis, the more digital the song is perceived ("elec"); the farther along the Z axis, the newer the song is perceived ("newly"). In the song selection image SDI, the user is thus prompted intuitively to recognize the following: that the smaller the X axis value of a given song indicator SI, the slower the corresponding song is perceived, and the larger the X axis value, the faster the song is perceived; that the smaller the Y axis value of the song indicator SI, the more analog the song is perceived, and the larger the Y axis value, the more digital the song is perceived; and that larger the Z axis value of the song indicator SI, the older the song is perceived, and the larger the Z axis value, the newer the song is perceived.

The operation area 32 on the song search screen 30 contains a play button 35 for controlling reproduction of the song selected on the song selection image SDI, a rewind button 36, a fast forward button 37, and a playing position display field 38 indicating the current playing position of the song being reproduced. The operation area 32 also has a playing song information display field 39 and a designated song information display field 40. The playing song information display field 39 shows information describing the song being reproduced, such as the title of the song in question, the name of the album containing the song, and the name of the artist involved (the information is called song information). The designated song information display field 40 indicates the song information corresponding to the song identifier SI designated by the cursor Cu. The operation area 32 further includes a search condition input field 41 in which to input a search condition for searching for a given song (e.g., artist name, album title, and/or genre name). The operation area 32 also contains a list creation button 42 used to create a play list that determines the order in which a plurality of songs are to be reproduced.

When the user inputs a command to move the cursor Cu using the operation keys 14 over the song search screen 30 displayed on the display device 20, the CPU 10 moves the cursor Cu accordingly on the song selection image SDI. If the tip of the moving cursor CU is overlaid on a given song indicator SI, the CPU 10 causes the song information display field 40 to display the song information corresponding to the cursor-designated song identifier SI. It might happen that the user manipulating the operation keys 14 inputs a rotation command together with rotation angles by which to rotate the three-dimensional image TDI as the source of the song selection image SDI. In that case, the CPU 10 assumes that values (x, y, z) represent the three-dimensional coordinates in which individual song indicators SI are laid out inside the three-dimensional image TDI, that an angle $\theta 1$ denotes the designated rotation angle by which to rotate the three-dimensional image TDI around the X axis, and that an angle $\theta 2$ stands for the designated rotation angle by which to rotate the three-dimensional image TDI around the Y axis. On these assumptions, the CPU 10 uses the expression $$X = x \times \cos(\theta 2) - z \times \sin(\theta 2) \quad (1)$$

to obtain the X coordinate of each of the song indicators SI on the song selection image SDI in two-dimensional form, and resorts to the expression $$Y = (x \times \sin(\theta 2) + z \times \cos(\theta 2)) \times \sin(\theta 1) - y \times \cos(\theta 1) \quad (2)$$

to acquire the Y coordinate of each of the song indicators SI on the two-dimensional song selection image SDI.

Figure 6:
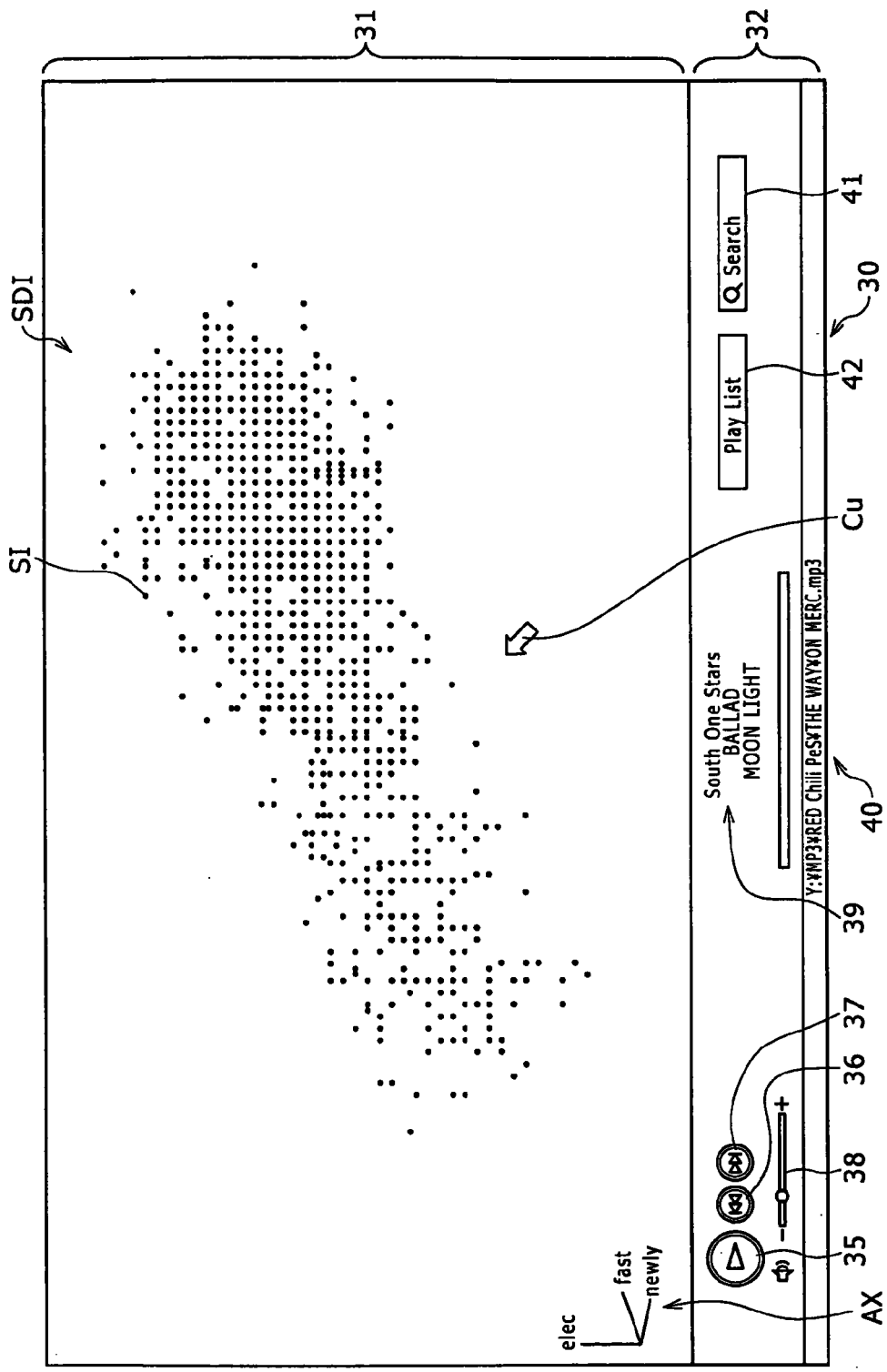
FIG. 6 is a schematic view showing how a three-dimensional image is rotated.
Figure 9:
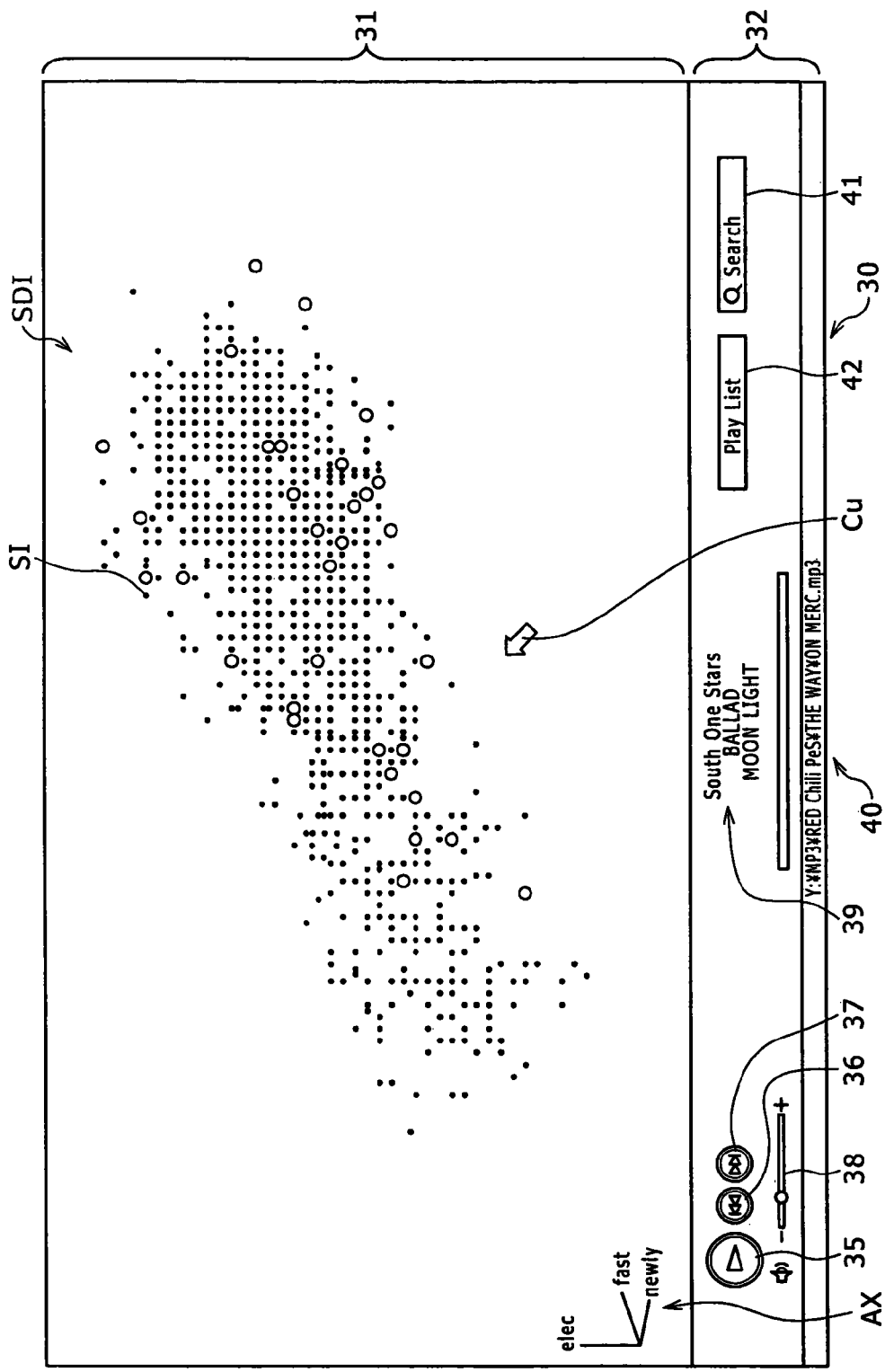
FIG. 9 is a schematic view showing how the result of a search for songs is presented on the song search screen.

Thereafter, as shown in FIG. 6, the CPU 10 creates a song selection image SDI constituted by the song indicators SI corresponding to the X and Y coordinates obtained above on the two-dimensional image. The song selection image SDI thus acquired is displayed inside the song selection area 31 on the song search screen 30. In this manner, when the user gives a command to change the point of view from which to view the three-dimensional image TDI as a rotated image, the CPU 10 transforms the three-dimensional image TDI into a song selection image SDI in two-dimensional by rotating the image TDI as viewed from the changed point of view and by projecting the rotated image onto the X-Y plane. The resulting two-dimensional image is displayed inside the song selection area 31. Where the three-dimensional image TDI is transformed into the song selection image SDI in two-dimensional form as viewed from a given point of view, it might happen that at least two song indicators SI are aligned along the line of sight so that the song indicator SI in the foreground hides the other indicator or indicators in the background. In such a case, the CPU 10 may have the three-dimensional image TDI further rotated to reveal the hitherto-hidden song indicator or indicators SI to the user. When changing the point of view from which to view the three-dimensional image TDI according to the user's command, the CPU 10 rotates the three axes defining the image TDI as viewed from the changed point of view, transforming the three axes into a rotated perspective axis image AX projected onto a two-dimensional plane. Thus when the song selection image SDI is rotated as the three-dimensional image TDI inside the song selection area 31 on the song search screen 30, the CPU 10 still allows the user easily to recognize the impressions of the songs indicated by the individual song indicators SI thanks to the perspective axis image AX inside the song selection image SDI.

The data recording and reproducing apparatus 1 allows the user to push arrow keys as part of the operation keys 14. While a given arrow key is being pushed, the data recording and reproducing apparatus 1 continuously increases or decreases the user-designated rotation angle. With the given arrow key held down by the user, the CPU 10 repeatedly carries out the operations of the expressions (1) and (2) above to reflect the rotation angle value being changed consecutively. Based on the result of the operations, the CPU 10 changes the point of view while gradually rotating the three-dimensional image TDI. The consecutively changing point of view is being reflected in real time on the song selection image SDI. That is, in keeping with the user-designated command to rotate the three-dimensional image TDI, the CPU 10 gradually rotates the song selection image SDI as the three-dimensional image TDI inside the song selection area 31 on the song search screen 30. In this manner, the CPU 10 lets the user select with ease the point of view from which to view the three-dimensional image TDI depending on how the song indicators SI pointing to the songs with preferred impressions are being displayed. After rotating the three-dimensional image TDI into an image as viewed from a point of view different from the initial viewpoint, the CPU 10 lets the rotation be reflected on the song selection image SDI inside the song selection area 31 on the song search screen 30. Thereafter, the user may point the cursor Cu onto the perspective axis image AX and select the image AX (i.e., by clicking on it). The selection of the perspective axis image AX is interpreted as a projected image initialization command. Given that command, the CPU 10 again rotates the three-dimensional image TDI into the image as viewed from the initial point of view, and has the rotation reflected on the song selection image SDI inside the song selection area 31 on the song search screen 30. In this manner, after rotating the song selection image SDI as the three-dimensional image TDI inside the song selection area 31 on the song search screen 30 in accordance with the user's request, the CPU 10 can readily undo the rotation.

When an enlarged display command is input by the user through the operation keys 14, the CPU 10 enlarges the song selection image SDI at a predetermined enlargement ratio illustratively in reference to the position where the tip of the cursor Cu is overlaid on the image SDI (the position is called the enlargement conversion center). Inside the song selection area 31 on the song search screen 30, the CPU 10 displays the magnified part of the song selection image SDI in a manner having the enlargement conversion center aligned with the center of the song selection area 31 (the latter center is called the area center). In this manner, every time the user requests an enlarged display, the CPU 10 successively enlarges the song selection image SDI displayed inside the song selection area 31 on the song search screen 30. If the user inputs a reduced display command through the operation keys 14, the CPU 10 reduces the song selection image SDI at a predetermined reduction ratio in reference to the enlargement conversion center. Then inside the song selection area 31 on the song search screen 30, the CPU 10 displays the reduced song selection image SDI in a manner having the enlargement conversion center aligned with the area center of the song selection area 31. Every time the user requests a reduced display, the CPU 10 successively reduces the song selection image SDI inside the song selection area 31 on the song search screen 30. In this manner, when presenting the song selection image SDI, the CPU 10 can enlarge or reduce the individual song indicators ID to an easily recognizable scale for the user's convenience.

With display status of the song selection image SDI changed as necessary inside the song selection area 31 on the song search screen 30, the user manipulating the operation keys 14 may move the cursor Cu to a desired point and select that point as a target part on the song selection image SDI. In that case, the CPU 10 detects the two-dimensional coordinates of that position of the song selection image SDI on which the tip of the cursor Cu is overlaid (the position is called the target position). The CPU 10 then transforms the two-dimensional coordinates of the target position detected on the song selection image SDI into three-dimensional coordinates in the three-dimensional image TDI by reversing the operations of the expressions (1) and (2) above (the transformed three-dimensional coordinates, currently closest to the point of view in the three-dimensional image TDI, are called the target position space coordinates). As shown in FIG. 7, the CPU 10 obtains the space coordinates of a target position P0 developed from the song selection image SDI into the three-dimensional image TDI (the position P0 is called the developed target position), as well as the space coordinates of each of song indicators SI1 through SIn in the image TDI. The CPU 10 then compares the distances in coordinates between the target position P0 on the one hand and the song indicators SI1 through SIn on the other hand. Following the comparison, the CPU 10 selects a predetermined reference number (e.g., 10) of song indicators SI1 through SIm within increasing distance from the developed target position P0. Of the selected song indicators SI1 through SIm, the song indicator SI1 closest to the developed target position P0 is recognized by the CPU 10 as the song indicator pointing to the song selected by the user according to his or her preferences (the song is called the target song). At the same time, the remaining song indicators SI2 through SIm are interpreted by the CPU 10 as the song indicators corresponding to the songs that are highly likely to be selected by the user (the songs are called the candidate songs).

On the song selection image SDI of the song search screen 30, as shown in FIG. 8, the CPU 10 displays the song indicator SI1 indicating the target song in a manner different (e.g., in a different color) from the other song indicators SI2 through SIn. Furthermore, the CPU 10 displays the song indicators SI2 through SIm pointing to the candidate songs in a manner also different (e.g., in a different color) from the nearby song indicators SIn. In this way, the CPU 10 presents the user with the user-selected target song, the candidate songs derived from the target song, and the remaining songs by displaying their song indicators SI through SIn illustratively in different colors for easy discrimination of songs by the user in terms of impressions.

After discriminating the target song and multiple candidate songs from the rest, the CPU 10 proceeds to reproduce first the target song represented by the song indicator SI1 closest to the developed target position P0, followed successively by the candidate songs denoted by the song indicators SI2 through SIm within increasing distance from the song indicator SI1. The actual reproduction of songs by the CPU 10 allows the user to determine whether the target song and candidate songs give the impressions preferred by (or fairly satisfactory to) the user. Preferably, the CPU 10 may be arranged successively to reproduce predetermined highlights of the target song and candidate songs instead of reproducing them in full. This makes it possible for the user to verify in a relatively short time whether each of the target song and candidate songs satisfies the user's preferences.

During reproduction, the CPU 10 causes the song indicator (one of those SI1 through SIm) representing the currently reproduced target or candidate song to be displayed in a reproduction-specific state (e.g., in a color uniquely indicating the reproducing state) while displaying the song information about that song in the playing song information display field 39 of the song search screen 30. In this manner, the CPU 10 can give the user the title or other information about the now-playing target or candidate song while presenting the impressions of the song in question. If the user manipulating the operation keys 14 inputs a single-song reproduction command at the push of the play button 35 in the operation area 32 of the song search screen 30, then the CPU 10 starts reproducing the currently reproduced target or candidate song again from the beginning. This feature, when used during automatic and continuous reproduction of the highlights of the target and candidate songs, permits the CPU 10 to switch from highlight reproduction to full-fledged playing of an attractively-sounding song in its entirety for verification of the impressions by the user.

It might happen that the user manipulating the operation keys 14 inputs a playing-song rewind command at the push of the rewind button 36. In that case, the CPU 10 stops reproducing the currently playing candidate song as a whole or in highlight and starts reproducing the highlight of the immediately preceding target or candidate song. This feature, when used during reproduction of a candidate song, permits the CPU 10 rapidly to meet the user's request to compare the currently reproduced candidate song with the immediately preceding target or candidate song in terms of impressions. If the user inputs a playing-song rewind command while the target song is being reproduced as a whole or in highlight, then the CPU 10 starts reproducing the highlight of that song again from the beginning. Thus during reproduction of the target song, the CPU 10 causes the song to be reproduced repeatedly as requested so that the user may sufficiently grasp the impressions of the song in question. It might also happen that during reproduction of the target song or a candidate song in highlight or as a whole, the user manipulating the operation keys 14 inputs a playing-song fast forward command at the push of the fast forward button 37. In such a case, the CPU 10 stops reproducing the target or candidate song in its entirety or in highlight and starts reproducing the highlight of the next candidate song. With this feature, the CPU 10 goes to the next song by skipping as requested the currently playing target or candidate song as soon as the user has verified the impressions of that song. This allows the user to avoid wasting time on the target or candidate song whose impressions have been checked.

It might happen that with a search condition entered in the search condition input field 41 of the operation area 32 on the song search screen 30, the user manipulating the operation keys 14 inputs a search command. In that case, the CPU 10 searches for a matching song or songs based on the user-input search condition and on a plurality of items of song-related information about a plurality of songs. After the successful search for the matching song or songs, the CPU 10 determines one or a plurality of song indicators SI corresponding to the detected song or songs in accordance with the song identification information and song analysis information 25 as part of the song-related information about the detected song or songs. The CPU 10 proceeds to display the corresponding song indicator or indicators SI in a manner different (e.g., in a different color) from the other song indicators SI inside the song selection image SDI on the song search screen 30. In this way, the CPU 10 easily and precisely presents the user with the impressions of the song or songs of which the artist name, album title, genre, etc., were designated as the search condition. It should be noted that even after a target song is selected or after the result of a search is displayed inside the song selection image SDI, the CPU 10 can still rotate the song selection image SDI and can also enlarge or reduce the displayed image in the manner described above. As a result, the CPU 10 allows the user to get an easy-to-understand picture of how many songs have the impressions close to those of the target song or detected songs.

It might happen that with the target song and a plurality of candidate songs determined inside the song selection image SDI of the song search screen 30, the user manipulating the operation keys 14 inputs a play list creation command at the push of the list creation button 42 in the operation area 32 of the song search screen 30. In that case, the CPU 10 creates a play list 50 such as one shown in FIG. 10, the list being used to register the target song and a plurality of candidate songs. At this point, the CPU 10 issues identification information PLI specific to the play list 50 (the information is called the list identification information) and attaches the issued information to the play list 50. In the play list 50, the CPU 10 further registers target position space coordinates of the above-mentioned developed target position P0 indicating the user-preferred impressions that served as the basis for selecting the target song and multiple candidate songs (the coordinates constitute three impression item values indicative of the preferred impressions designated by the user on the song selection image SDI; these impressions are called the selection standard impression values). In the play list 50, the CPU 10 also registers the target song and multiple candidate songs in the form of song identification information SS included in each of a plurality of items constituting the corresponding song analysis information 25. In creating the play list 50, the CPU 10 lists a plurality of items of song identification information SS illustratively in a manner first denoting the target song with its song indicator SI1 closest to the developed target position P0 followed by the candidate songs with their song indicators SI2 through SIm within increasing distance from the song indicator SI1. By listing the multiple items of song identification information SS in such a manner, the CPU 10 defines the order in which to reproduce the target song and multiple candidate songs (e.g., the target song is reproduced first, followed by the candidate songs being reproduced successively). After creating the play list 50, the CPU 10 records it to the hard disk drive 16 as play list data.

On creating a play list 50, the CPU 10 allows the user to give the created list a list name that identifies the list as desired by the user. Such list names are also recorded by the CPU 10 to the hard disk drive 16 as part of list management information that contains the list names in association with list identification information PLI. When the user designates a list name for song data reproduction and inputs a play command to reproduce the designated song data, the CPU 10 identifies the play list 50 carrying the designated list name and reads the play list data from the hard disk drive 16. According to the retrieved play list 50, the CPU 10 reproduces a plurality of songs successively so that the user may listen consecutively to the target song and multiple candidate songs as listed in the play list 50.

When reproducing the target song and a plurality of candidate songs from a play list 50, the CPU 10 checks to determine continuously whether each of the target song and multiple candidate songs has been reproduced. Illustratively, when reproducing any one of the target and candidate songs according to the play list 50, the CPU 10 considers the currently-playing song to have been reproduced upon elapse of a predetermined time period from the beginning of the song in question. It might happen that the user manipulating the operation keys 14 inputs a fast forward command so as to skip the about-to-be-reproduced (i.e., yet to be reproduced) target song or one of the candidate songs for a jump to the next-to-be-reproduced candidate song. In such a case, the CPU 10 does not consider the skipped target or candidate song to have been reproduced. Throughout such user operations, the CPU 10 counts the number of times each of the target song and multiple candidate songs listed on each play list 50 in order to obtain values for evaluating how much each of the songs has been appreciated by the user in terms of their closeness to the user's preferred impressions. The CPU 10 associates each reproduction count as the evaluation value for each of the target and candidate songs per each play list 50, with song identification information SS to determine degrees of appreciation of the listed songs. At the same time, the CPU 10 creates reproduction count information by associating the reproduction counts of the listed songs with the list identification information PLI in the play list 50 of interest, and records the created information to the hard disk drive 16.

With the above arrangements in place, the user manipulating the operation keys 14 may designate a given play list 50 and input a content modification command with regard to the designated play list 50. In that case, the CPU 10 modifies the content of the designated play list 50 using the reproduction count information corresponding to the list. Illustratively, the CPU 10 may carry out the content modification process on the play list 50 using one of a first through a third processing technique. The CPU 10 typically allows the user to select one of the first through the third processing techniques for modification of the desired play list 50. What follows is a description of the first through the third techniques that may be adopted for content modification of the play list 50.

If the user selects the first processing technique for modifying the content of a given play list 50, the CPU 10 reads the designated play list 50 as play list data from the hard disk drive 16 together with the reproduction count information about the retrieved play list. Based on the reproduction count information, the CPU 10 adds up the reproduction counts of all songs (i.e., target and candidate songs) registered in the play list 50 to be modified, and compares the total reproduction count thus obtained with a predetermined total standard reproduction count. If the total reproduction count is found to be larger than the total standard reproduction count, then it may be concluded that the play list 50 in question has been used with relatively high frequency for reproduction of the listed target and candidate songs and that these songs are highly likely to have the impressions preferred by the user. By contrast, if the total reproduction count is found smaller than the total standard reproduction count, it may be concluded that the play list 50 in question has been used with relatively low frequency for reproduction of the listed target and candidate songs and that these songs are highly likely to have the impressions different from those preferred by the user.

At this point, the CPU 10 reads the corresponding song analysis information 25 from the hard disk drive 16. Where the total reproduction count is found larger than the total standard reproduction count, the CPU 10 replaces a standard selection count constituting the current range of selected songs with an increased selection count (e.g., 20 songs). The CPU 10 proceeds to acquire, for comparison, the space distances between the selection standard impression values SSI (i.e., target position space coordinates of the developed target position P0) on the one hand, and the three-dimensional coordinates of the song indicators SI indicative of the songs involved on the other hand. In keeping with the result of the comparison, the CPU 10 newly selects as many song indicators SI as the increased selection count within increasing distance from the developed target position P0 denoted by the selection standard impression values SSI (i.e., target position space coordinates). After the selection, the CPU 10 discriminates the songs corresponding to the newly-selected song indicators SI as the target song and multiple candidate songs in the manner discussed above. Furthermore, the CPU 10 modifies the play list 50 in question by supplementing it with a plurality of candidate songs which are part of the newly selected songs and which do not overlap with the already-registered target song and candidate songs. The play list 50 modified as described is sent from the CPU 10 to the hard disk drive 16 as play list data. The CPU 10 then overwrites the current play list data with the modified play list data on the hard disk drive 16.

Figure 11:
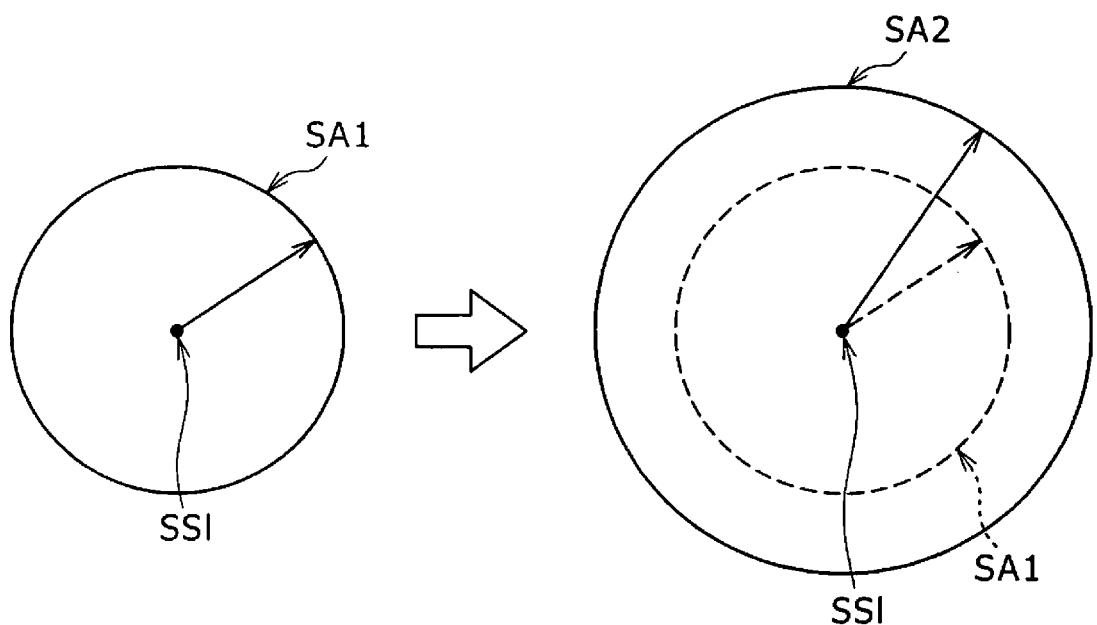
FIG. 11 is a schematic view showing how play list contents are updated by a first processing technique (part 1)

As shown in FIG. 11, where the target song and multiple candidate songs registered in a given play list 50 are found frequently listened to by the user, the CPU 10 substitutes a more extensive spherical selection range SA2 for the current spherical selection range SA1 established around the selection standard impression values SSI inside the three-dimensional image TDI when the play list 50 of interest was created. To the newly-established selection range SA2, the CPU 10 adds a plurality of candidate songs whose impressions are close to those preferred by the user as represented by the selection standard impression values SSI. The supplemental candidate songs are additionally registered in the play list 50. That is, when the target song and a plurality of candidate songs in a given play list 50 are found frequently listened to by the user, the CPU 10 modifies the play list 50 in content by adding more candidate songs thereto. This allows the user to listen to more songs (i.e., target and candidate songs) of the impressions meeting (or close to) the user's preferences.

If the total reproduction count is found to be smaller than the total standard reproduction count, the CPU 10 replaces the standard selection count constituting the current range of selected songs with a reduced selection count (e.g., five songs). The CPU 10 then acquires, for comparison, the space distances between the selection standard impression values SSI (i.e., target position space coordinates of the developed target position P0) on the one hand, and the three-dimensional coordinates of the song indicators SI indicative of the songs involved on the other hand. In keeping with the result of the comparison, the CPU 10 newly selects as many song indicators SI as the reduced selection count within increasing distance from the developed target position P0 denoted by the selection standard impression values SSI (i.e., target position space coordinates). After the selection, the CPU 10 discriminates the songs corresponding to the newly-selected song indicators SI as the target song and multiple candidate songs in the manner discussed above. Furthermore, the CPU 10 modifies the play list 50 in question by registering the newly-discriminated target song and candidate songs in the list and by deleting the already-registered candidate songs other than those newly selected (i.e., by canceling the registration). The play list 50 modified as described is sent from the CPU 10 to the hard disk drive 16 as play list data. The CPU 10 proceeds to overwrite the current play list data with the modified play list data on the hard disk drive 16.

Figure 12:
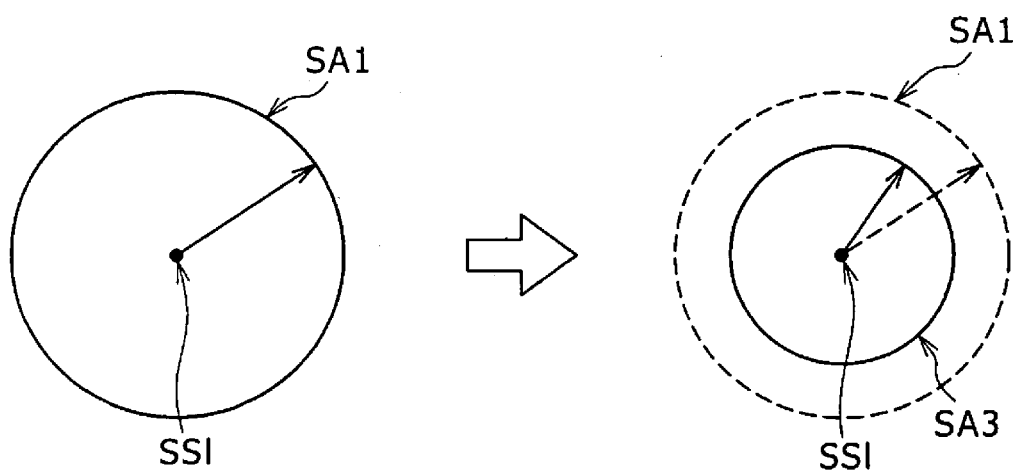
FIG. 12 is a schematic view showing how play list contents are updated by the first processing technique (part 2)

As shown in FIG. 12, where the target song and multiple candidate songs registered in a given play list 50 are found not much listened to by the user, the CPU 10 substitutes a contracted spherical selection range SA3 for the current spherical selection range SA1 established around the selection standard impression values SSI inside the three-dimensional image TDI when the play list 50 of interest was created. Given the newly-established selection range SA3, the CPU 10 leaves intact the within-range target song and multiple candidate songs as the songs whose impressions are very close to those preferred by the user and retains these songs in the play list 50. The remaining candidate songs are deleted from the play list 50. That is, when the target song and a plurality of candidate songs in a given play list 50 are found not much listened to by the user, the CPU 10 modifies the play list 50 in content by deleting some candidate songs therefrom. This allows the user to listen to the songs of the impressions very close to the user's preferences (i.e., target song and some candidate songs left intact in the play list 50).

If the user selects the second processing technique for modifying the content of a given play list 50, the CPU 10 reads the designated play list 50 as play list data from the hard disk drive 16 together with the reproduction count information about the retrieved play list. Based on the reproduction count information, the CPU 10 compares the reproduction count of each of the songs (i.e., target and candidate songs) registered in the play list 50 to be modified, with a predetermined individual standard reproduction count. If the reproduction count of a given song in the play list 50 is found larger than the individual standard reproduction count, it may be concluded that the song in question is highly likely to have the impressions preferred by the user. By contrast, if the reproduction count of a given song in the play list 50 is found smaller than the individual standard reproduction count, it may be concluded that the song in question is highly likely to have the impressions different from those preferred by the user.

At this point, the CPU 10 reads the corresponding song analysis information 25 from the hard disk drive 16. In accordance with the result of the comparison between the reproduction count of each of the songs in the play list 50 to be modified and the individual standard reproduction count, and on the basis of the three-dimensional coordinates denoting the song indicators SI indicative of these songs, the CPU 10 detects three-dimensional coordinates representative of the song indicators SI pointing to the songs reproduced more often than the individual standard reproduction count. The CPU 10 uses the detected three-dimensional coordinates in a manner either unmodified or weighted depending the reproduction count (i.e., the higher the reproduction count, the larger the weight) so as to correct the selection standard impression values SSI (i.e., target position space coordinates of the developed target position P0) into impression values representing the impressions closest to those preferred by the user. The CPU 10 then acquires for comparison the space distances between the corrected selection standard impression values SSI (i.e., three-dimensional coordinates, called the corrected standard impression values) on the one hand, and the three-dimensional coordinates of the song indicators SI indicative of the songs involved on the other hand. In keeping with the result of the comparison, the CPU 10 newly selects as many song indicators SI as, say, the standard selection count within increasing distance from the corrected target position denoted by the corrected standard impression values. After the selection, the CPU 10 discriminates the songs corresponding to the newly-selected song indicators SI as the target song and multiple candidate songs in the manner discussed above. Furthermore, the CPU 10 modifies the play list 50 in question by deleting the currently-registered target and candidate songs (i.e., by canceling the registration) from the list and by registering the newly-discriminated target song and candidate songs in the list. The play list 50 modified as described is sent from the CPU 10 to the hard disk drive 16 as play list data. The CPU 10 proceeds to overwrite the current play list data with the modified play list data on the hard disk drive 16.

Figure 13:
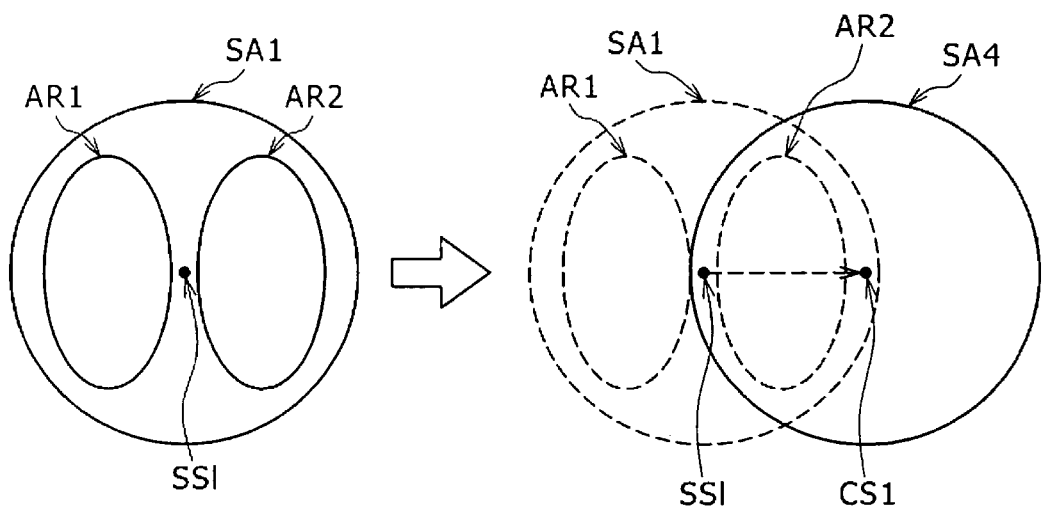
FIG. 13 is a schematic view showing how play list contents are updated by a second processing technique.

As shown in FIG. 13, where some of the target song and multiple candidate songs registered in a given play list 50 are found frequently listened to by the user while the others are not much listed to, the CPU 10 detects the distribution of the song indicators SI indicative of the much-reproduced songs and the indicators SI representative of not-much-reproduced songs within the current spherical selection range SA1 established around the selection standard impression values SSI inside the three-dimensional image TDI when the play list 50 of interest was created. Inside the three-dimensional image TDI, the CPU 10 proceeds to bring the selection standard impression values SSI as far away as possible from a first area AR1 in which a relatively large number of song indicators SI of the not-much-reproduced songs are distributed and as close as possible to or into a second area AR2 where a relatively large number of song indicators SI of the much-reproduced songs are distributed. The values thus moved are regarded as newly-corrected standard impression values CSI. The earlier range of selected songs SA1 is replaced by a newly-established spherical selection range SA4 brought about by moving the selection range SA1 with its corrected standard impression values CSI kept as the center. In the new selection range SA4 within the three-dimensional image TDI, the CPU 10 selects the target song and a plurality of candidate songs with their impressions closest to those preferred by the user as represented by the corrected standard impression values CSI. The target and candidate songs thus selected are registered anew in the play list 50. That is, when a given play list 50 is found to contain both the songs much listened to by the user and those not much listened to, the CPU 10 modifies the play list 50 in question in such a manner as to increase the number of songs whose impressions are close to those preferred by the user and to reduce the number of songs with their impressions different from those favored by the user (i.e., songs not much listened to). In this way, the CPU 10 allows the user to listen to more songs whose impressions are as close as possible to those preferred by the user (i.e., target song and a plurality of candidate songs).

If the user selects the third processing technique for modifying the content of a given play list 50, the CPU 10 compares, as in the case of the second processing technique, the reproduction count of each of the songs (i.e., target and candidate songs) registered in the play list 50 to be modified, with a predetermined individual standard reproduction count. Of the three-dimensional coordinates positioning the song indicators SI representative of the individual songs registered in the play list 50, the coordinates of the song indicators SI indicating the songs that have been reproduced more often than the individual standard reproduction count are detected by the CPU 10. The CPU 10 uses the detected three-dimensional coordinates in a manner either unmodified or weighted depending the reproduction count (i.e., the higher the reproduction count, the larger the weight) so as to determine the direction of the impressions closest to those preferred by the user on the basis of the selection standard impression values SSI (i.e., target position space coordinates of the developed target position P0) included in the play list 50 (the direction is called the preferred direction of impressions). The CPU 10 then acquires for comparison the space distances between the selection standard impression values SSI (i.e., target position space coordinates) on the one hand, and the three-dimensional coordinates of the song indicators SI indicative of the songs involved on the other hand. In keeping with the result of the comparison, the CPU 10 discriminates a plurality of song indicators SI within increasing distance from the song indicator SI closest to the developed target position P0 denoted by the selection standard impression values SSI (target position space coordinates). From the discriminated song indicators SI, the CPU 10 newly selects as many song indicators SI as, say, an increased selection count (e.g., 20 songs) in such a manner that more song indicators SI in the preferred direction of impressions may be selected than the song indicators SI in a direction opposed to the preferred direction in a predetermined ratio (the opposed direction is called the opposite direction of impressions). After the selection, the CPU 10 discriminates the songs corresponding to the newly-selected song indicators SI as the target song and multiple candidate songs in the manner discussed above. Furthermore, the CPU 10 modifies the play list 50 in question by deleting the currently-registered target and candidate songs (i.e., by canceling the registration) from the list and by registering the newly-discriminated target song and candidate songs in the list. The play list 50 modified as described is sent from the CPU 10 to the hard disk drive 16 as play list data. The CPU 10 proceeds to overwrite the current play list data with the modified play list data on the hard disk drive 16.

Figure 14:
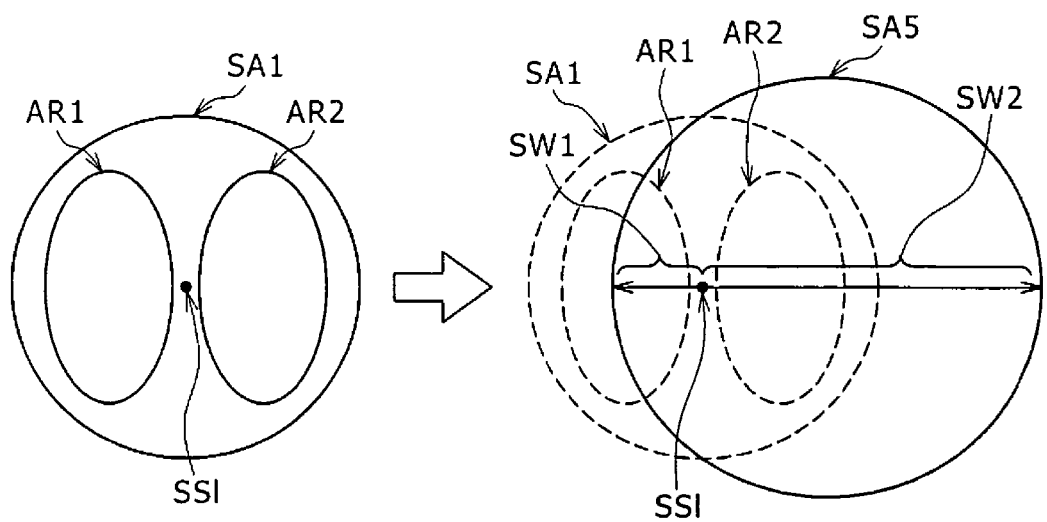
FIG. 14 is a schematic view showing how play list contents are updated by a third processing technique.

As shown in FIG. 14, where some of the target song and multiple candidate songs registered in a given play list 50 are found frequently listened to by the user while the others are not, the CPU 10 detects the distribution of the song indicators SI indicative of the much-reproduced songs and the indicators SI representative of not-much-reproduced songs within the current spherical selection range SA1 established around the selection standard impression values SSI inside the three-dimensional image TDI when the play list 50 of interest was created. Inside the three-dimensional image TDI, the CPU 10 proceeds to replace the current selection range SA1 with a spherical or ellipsoidal new selection range SA5 in such a manner that a first selection width SW1 in the opposite direction of impressions where the first area AR1 exits may be narrowed with the selection standard impression values SSI used as the starting point while a second selection width SW2 in the preferred direction of impressions where the second area AR2 exists may be widened. Inside the new selection range SA5 of the three-dimensional image TDI, the CPU 10 selects the target song and a plurality of candidate songs of which the impressions are closest to those preferred by the user, and registers the newly-selected songs in the play list 50. That is, when a given play list 50 is found to contain both the songs much listened to by the user and those not much reproduced, the CPU 10 modifies the play list 50 in question in such a manner as to increase the number of songs whose impressions are close to those preferred by the user and to reduce the number of songs with their impressions different from those favored by the user (i.e., songs not much listened to). In this way, the CPU 10 allows the user to listen to more songs whose impressions are as close as possible to those preferred by the user (i.e., target song and a plurality of candidate songs).

Figure 15:
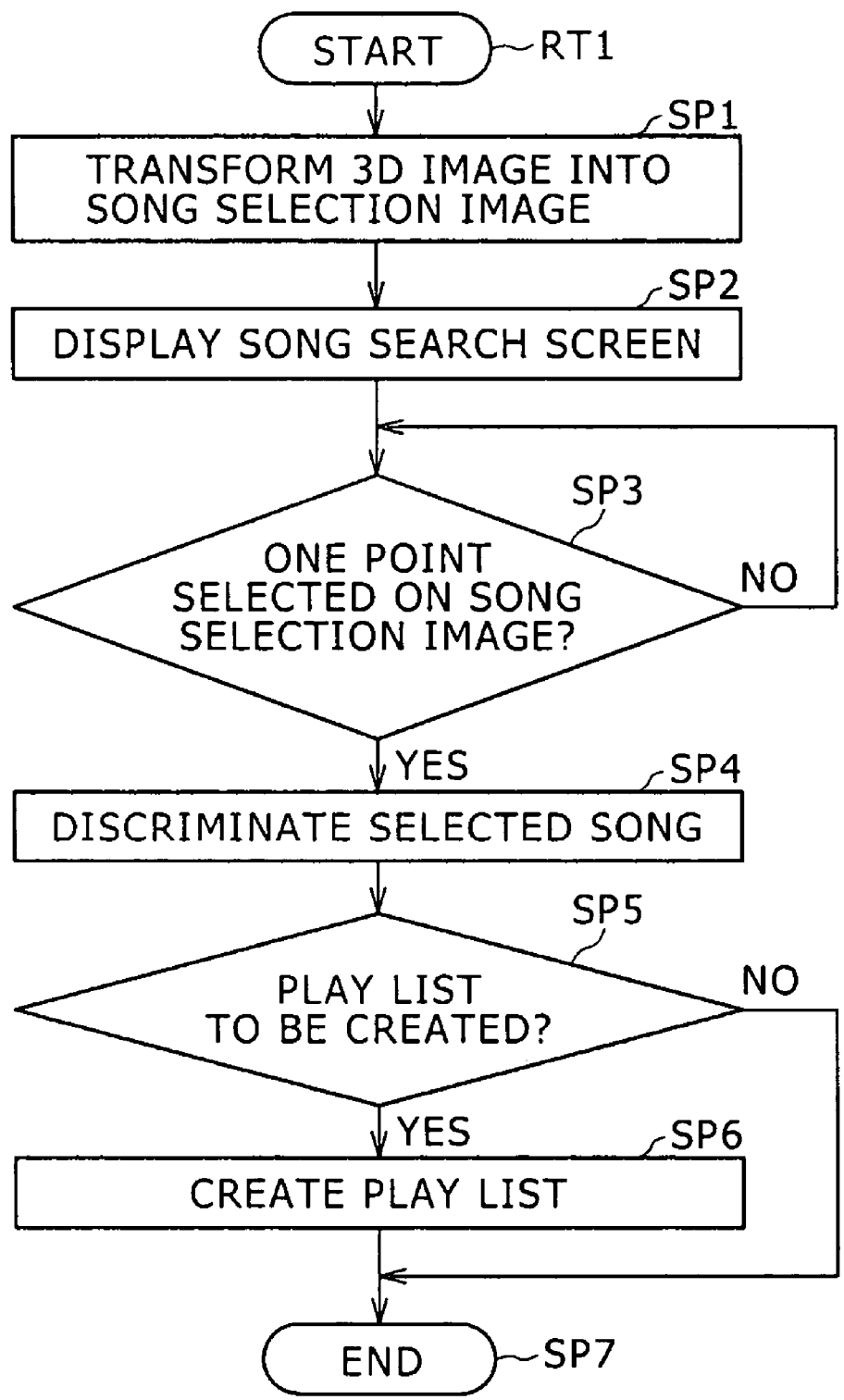
FIG. 15 is a flowchart of steps constituting a song selection procedure.

In practice, the CPU 10 carries out the above-described song selection process in accordance with a song selection program preinstalled in the ROM 12. When the user inputs a song selection request by manipulating the operation keys 14, the CPU 10 starts a song selection procedure RT1 (shown in FIG. 15) based on the song selection program. With the song selection procedure RT1 started, the CPU 10 goes to step SP1. In step SP1, the CPU 10 regards a set of the first, the second, and the third impression item values SP, EL, and NE included in the song analysis information 25 on each of the songs involved as three-dimensional coordinates, associates these three-dimensional coordinates with song indicators SI constituting a three-dimensional image TDI, and transforms the three-dimensional image TDI thus created into a song selection image SDI in two-dimensional form viewed from the initial point of view. In step SP2, the CPU 10 creates song search screen data using the song selection image SDI, forwards the created data to the display device 22 through the display controller 21, and causes the display device 22 to display the song search screen 30 based on the song search screen data. Step SP2 is followed by step SP3.

In step SP3, the CPU 10 waits for any one point to be selected by the user as a target part on the song selection image SDI displayed in the song selection area 31 of the song search screen 30, the target part representing the impressions preferred by the user. When one such point is selected by the user on the song selection image SDI, step SP4 is reached. In step SP4, the CPU 10 transforms the user-selected point on the song selection image SDI representing his or her preferred impressions into a developed target position P0 in the three-dimensional image TDI. Based on the target position space coordinates of the developed target position P0 as the selection standard impression values SSI and on the three-dimensional coordinates positioning a plurality of song indicators SI, the CPU 10 discriminates the target song selected by the user according to his or her preferred impressions along with a plurality of candidate songs that are highly likely to be selected in keeping with the user's preferences. Step SP4 is followed by step SP5.

In step SP5, the CPU 10 checks to determine whether a play list 50 is ordered to be created. If the result of the check in step SP5 is affirmative, that means the user has requested to have the target song and multiple candidate songs put into a list so that these songs need not be selected again individually whenever desired to be reproduced. At this point, the CPU 10 goes to step SP6 and creates the play list 50 containing the target song and multiple candidate songs discriminated in step SP4. Step SP6 is followed by step SP7 in which the CPU 10 brings the song selection procedure RT1 to an end. If the result of the check in step SP5 is negative, that means the user has not requested to have the target and multiple candidate songs listed for subsequent reproduction of the songs whenever desired. At this point, the CPU 10 skips step SP6 to reach step SP7 and terminates the song selection procedure RT1.

Figure 16:
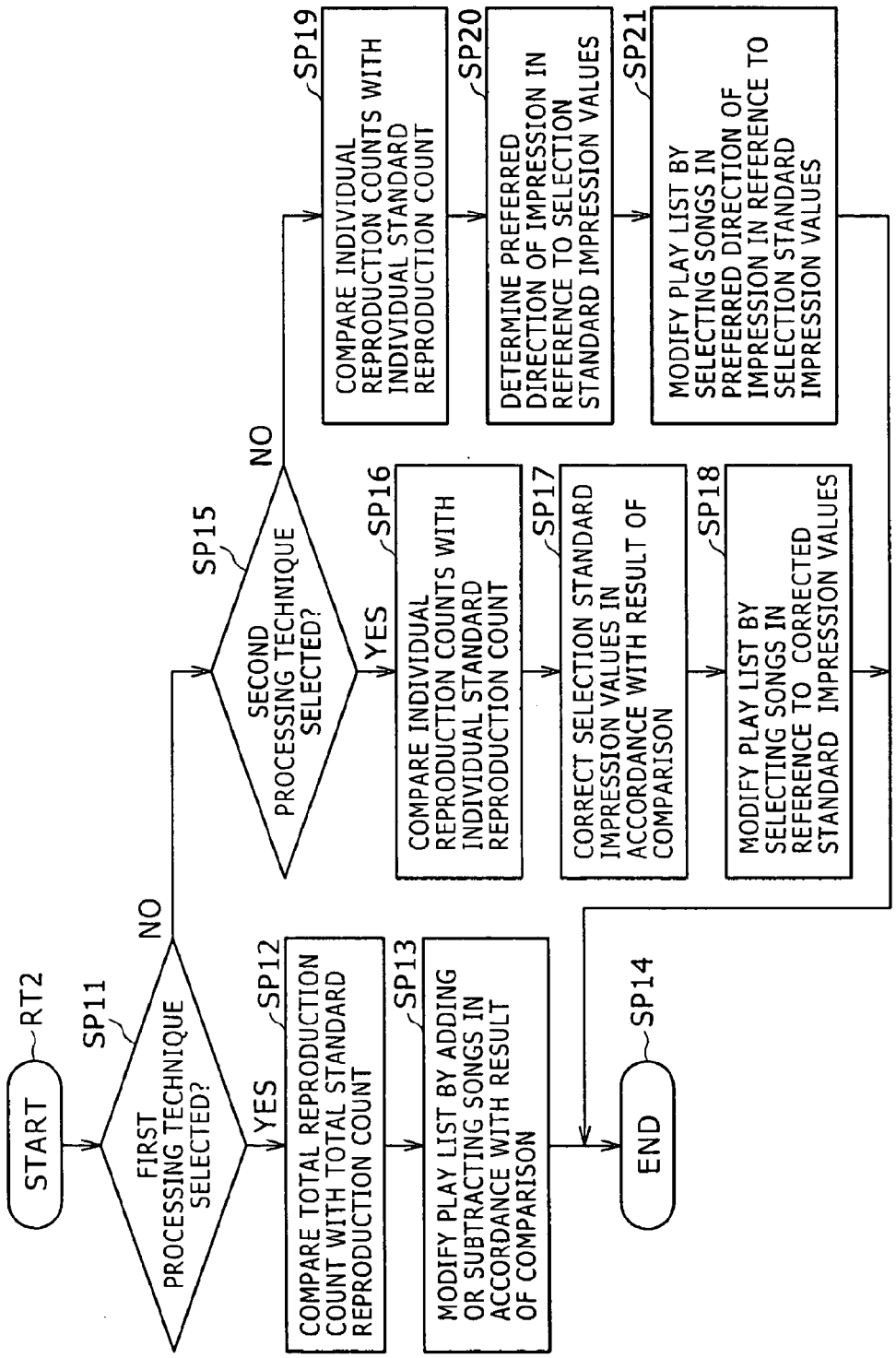
FIG. 16 is a flowchart of steps constituting a list modification procedure.

The CPU 10 performs the above-described content modification process on the play list 50 in accordance with a list modification program preinstalled in the ROM 12. When the user designates the play list 50 to be modified and inputs a modification command by manipulating the operation keys 14, the CPU 10 starts a list modification procedure RT2 (shown in FIG. 16) based on the list modification program. With the list modification procedure RT2 started, the CPU 10 goes to step SP11 in which the CPU 10 checks to determine whether the user has selected the first processing technique. If the result of the check in step SP11 is affirmative, that means the target song and a plurality of candidate songs registered in the play list 50 to be modified are as a whole songs with impressions close to the user's preferences, or that the listed songs as a whole differ from the user's preferences. In either case, the CPU 10 goes to step SP12.

In step SP12, the CPU 10 adds up the reproduction counts of all songs (i.e., target and candidate songs) registered in the play list 50, and compares the total reproduction count thus obtained with a predetermined total standard reproduction count. In step SP13, the CPU 10 replaces the standard selection count with an increased or reduced selection count depending on the result of the comparison. In reference to the selection standard impression values SSI, the CPU 10 newly selects as many song indicators SI as the increased or reduced selection count reflecting the result of the comparison. The CPU 10 then discriminates the songs corresponding to the selected song indicators SI as the target song and multiple candidate songs, and modifies the play list 50 by adding or deleting some candidate songs thereto or therefrom in keeping with the result of the discrimination. In step SP14, the CPU 10 terminates the list modification procedure RT2.

If the result of the check in step SP11 is negative, that means some of the target and candidate songs registered in the play list 50 to be modified are much listened to by the user while the others are not. In that case, the CPU 10 goes to step SP15 and checks to determine whether the user has selected the second processing technique. If the result of the check in step SP15 is affirmative, that means the user has requested to replace at least part of the target song and multiple candidate songs currently registered in the play list 50 with new songs without changing the total number of songs to be registered. At this point, the CPU 10 goes to step SP16. In step SP16, the CPU 10 compares the reproduction count of each of the songs (i.e., target and candidate songs) registered in the play list 50 with a predetermined individual standard reproduction count. In step SP17, the CPU 10 corrects the selection standard impression values SSI into corrected standard impression values CSI depending the result of the comparison and thereby changes the location of the selection range in which to select the song indicators SI. Taking the corrected standard impression values CSI as the new standard, the CPU 10 in step SP18 selects as many new song indicators SI as the standard selection count. The CPU 10 discriminates the songs corresponding to the newly selected song indicators SI as the selected target and candidate songs, and modifies the play list 50 in question by newly registering the discriminated target and candidate songs in the list. Step SP18 is followed by step SP14 in which the CPU 10 terminates the list modification procedure RT2.

If the result of the check in step SP15 is negative, that means the user has requested not only to change the total number of the target song and a plurality of candidate songs registered in the play list 50 to be modified, but also to replace at least some of the currently registered songs with new ones. In this case, the CPU 10 goes to step SP19. In step SP19, the CPU 10 compares the reproduction count of each of the songs (i.e., target and candidate songs) registered in the play list 50 with a predetermined individual standard reproduction count. In step SP20, the CPU 10 determines the preferred direction of impressions in which to select more song indicators SI in reference to the selection standard impression values SSI based on the result of the comparison. In keeping with the preferred direction of impressions thus determined, the CPU 10 changes the location of the selection range in which to select the song indicators SI and the number of song indicators SI to be selected. Step SP20 is followed by step SP21 in which the CPU 10 newly selects as many song indicators SI as the increased selection count in the preferred direction of impressions in reference to the selection standard impression values SSI. The CPU 10 then discriminates the songs corresponding to the selected song indicators SI as the new target song and candidate songs, and modifies the play list 50 in question by registering the newly-discriminated target and candidate songs in the list. Step SP21 is followed by step SP14 in which the CPU 10 terminates the list modification procedure RT2.

Using the arrangements described above, the data recording and reproducing apparatus 1 records a plurality of songs to the hard disk drive 16 in data form. By analyzing the song data, the data recording and reproducing apparatus 1 expresses in numerical form each of three items representing the impressions of the songs constituted by the song data. The three items make up the song analysis information 25 containing the first, the second, and the third impression item values SP, EL, and NE about each song. The song analysis information 25 thus prepared is also recorded to the hard disk drive 16. When requested by the user to select a particular song, the data recording and reproducing apparatus 1 regards a set of the first, the second, and the third impression item values SP, EL, and NE included in all song analysis information 25 as three-dimensional coordinates constituting the song impression values indicative of the impressions of each song. The CPU 10 associates these three-dimensional coordinates with song indicators SI to make up a three-dimensional image TDI, and transforms the three-dimensional image TDI into a song selection image SDI in two-dimensional form viewed from the initial point of view. The CPU 10 causes the display device 22 to display the song search screen 30 including the song selection image SDI thus created.

In the state above, the user may select one point representing the preferred impressions on the song selection image SDI displayed in the song selection area 31 of the song search screen 30. At this point, the data recording and reproducing apparatus 1 transforms the selected point into a developed target position P0 in the three-dimensional image TDI. Based on the target position space coordinates of the developed target position P0 (i.e., selection standard impression values SSI) and on the three-dimensional coordinates positioning a plurality of song indicators SI, the data recording and reproducing apparatus 1 discriminates the target song selected by the user according to his or her preferences. At the same time, the data recording and reproducing apparatus 1 discriminates a plurality of candidate songs that are highly likely to be selected for their closeness to the impressions preferred by the user.

The data recording and reproducing apparatus 1 thus regards the first, the second, and the third impression item values SP, EL, and NE indicative of the impressions of each of the songs involved as three-dimensional coordinates, associates these three-dimensional coordinates with song indicators SI to make up the three-dimensional image TDI, and transforms the three-dimensional image TDI into the song selection image SDI in two-dimensional form. By presenting the user with a three-dimensional layout of the song indicators SI in the song selection image SDI, the data recording and reproducing apparatus 1 allows the user intuitively to recognize selectable songs together with their impressions. The user is prompted solely to select the preferred impressions of songs as a target part on the song selection image SDI. The data recording and reproducing apparatus 1 then discriminates the song of which at least two of the three impression items are closest to the user's preferences.

As described above, the data recording and reproducing apparatus 1 turns into numerical form three items representing the impressions of each of the songs involved so as to acquire the first, the second, and the third impression item values SP, EL, and NE constituting three-dimensional coordinates that denote song, indicators SI representing the songs in the three-dimensional image TDI. The three-dimensional image TDI is transformed into the song selection image SDI in two-dimensional form as viewed from a given point of view. With the song selection image SDI displayed on the display device 22, the user is prompted to select the target part of the image. Based on the position of the target part thus selected and on the positions of a plurality of song indicators SI, the data recording and reproducing apparatus 1 discriminates the target song from among a plurality of candidate songs. By presenting a three-dimensional layout of the song indicators SI in the song selection image SDI, the data recording and reproducing apparatus 1 allows the user intuitively to recognize selectable songs together with their impressions. By simply letting the user select preferred impressions of songs as the target part on the song selection image SDI, the data recording and reproducing apparatus 1 can discriminate the song whose impressions are closest to those favored by the user. In this manner, the data recording and reproducing apparatus 1 permits easy and precise selection of the songs having the impressions preferred by the user.

The user may issue a command to rotate the three-dimensional image TDI by changing the point of view from which to view the image TDI. In that case, the data recording and reproducing apparatus rotates the three-dimensional image TDI in such a manner as to be viewed from the changed point of view, projects the rotated 3D image onto a two-dimensional plane to obtain the song selection image SDI in two-dimensional form, and causes the display device 22 to display the acquired song selection image SDI. It might happen that at least two song indicators SI are aligned along the line of sight so that the song indicator SI in the foreground hides the other indicator or indicators in the background. In such a case, the data recording and reproducing apparatus 1 allows the three-dimensional image TDI to be rotated to reveal the hitherto-hidden song indicator or indicators SI to the user. In this manner, the three-dimensional lay out of all song indicators SI in the song selection image SDI makes it possible for the user to recognize all selectable songs together with their impressions. The user is allowed to select songs of preferred impressions in the three-dimensional image TDI from any point of view.

The data recording and reproducing apparatus 1 also displays the perspective axis image AX that represents the three axes viewed from a given point of view and serving as the reference for the three-dimensional image TDI. The image AX is shown as part of the image TDI. When presenting the three-dimensional image TDI as the song selection image SDI viewed from a given point of view, the data recording and reproducing apparatus 1 allows the user easily to recognize the impressions denoted by individual song indicators SI through the use of the perspective axis image AX appearing inside the three-dimensional image TDI. In addition, when the user gives a request to enlarge or reduce the song selection image SDI, the data recording and reproducing apparatus 1 enlarges or reduces the image SDI accordingly. That is, the data recording and reproducing apparatus 1 can change the song indicators SI to a scale easily recognizable by the user in the song selection image SDI being presented.

Furthermore, the data recording and reproducing apparatus 1 develops one point selected by the user on the song selection image SDI into a target position P0 inside the three-dimensional image TDI, and discriminates as the target song that song denoted by the song indicator SI1 closest to the developed target position P0. At the same time, in accordance with the space distances between the developed target position P0 on the one hand and the other song indicators SI2 through SIn on the other hand, the data recording and reproducing apparatus 1 detects a plurality of songs corresponding to song indicators SI2 through SIm surrounding the song indicator SI1 denoting the target song, and discriminates the detected songs as candidate songs that are highly likely to be selected for their closeness to the impressions preferred by the user. Thus the data recording and reproducing apparatus 1 further allows the user easily and precisely to choose from multiple candidate songs whose impressions are as close to the user's preferences as possible. On the song selection image SDI, the data recording and reproducing apparatus 1 displays the song indicator SI1 indicative of the target song in a manner different from the way the other song indicators SI2 through SIn are displayed. The apparatus 1 further displays the multiple song indicators SI2 through SIm representing the candidate songs in a manner also different from the way the other multiple song indicators SIn are displayed. Using these arrangements, the data recording and reproducing apparatus 1 can present the user with the song indicators SI1 through SIm indicating the target song and a plurality of candidate songs in ways distinct from the manner in which the other song indicators are displayed.

The data recording and reproducing apparatus 1 can move the cursor Cu on the song selection image SDI in response to the user's operations. When the moving cursor Cu is overlaid onto a given song indicator SI, the data recording and reproducing apparatus 1 displays the song information about the song corresponding to the cursor-pointed song indicator SI in the designated song information display field 40. This makes it possible precisely to inform the user of the title of the song whose song indicator SI is being presented on the song selection image SDI. The data recording and reproducing apparatus 1 can thus introduce to the user the title of the user-selected target song as well as the titles of the candidate songs whose impressions are similar to those of the target song. In addition, the data recording and reproducing apparatus 1 reproduces the target song and a plurality of candidate songs successively after they have been discriminated. The user is thus enabled to verify the impressions of the target song and those of the candidate songs through actual reproduction. By continuously reproducing the highlights of the target and candidate songs, the data recording and reproducing apparatus 1 allows the user to ascertain the impressions of these songs within a short time in a substantially accurate manner. After discrimination of the target song and a plurality of candidate songs by the data recording and reproducing apparatus 1, the user may request creation of a play list 50. In that case, the apparatus 1 creates the play list 50 in which the target and candidate songs in question are registered. Subsequent to the user's selection of preferred songs, the data recording and reproducing apparatus 1 can readily reproduce the selected songs according to the play list 50 thus created without bothering the user for a repeated selection procedure.

Figure 17A:
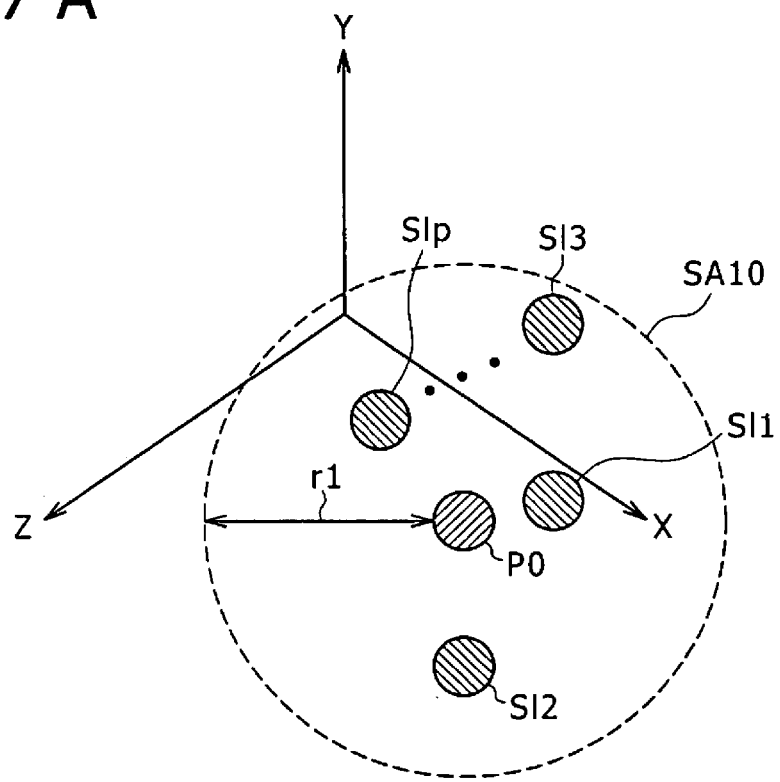
FIGS. 17A and 17B are schematic views showing how songs are selected by an alternative technique (part 1)
Figure 17B:
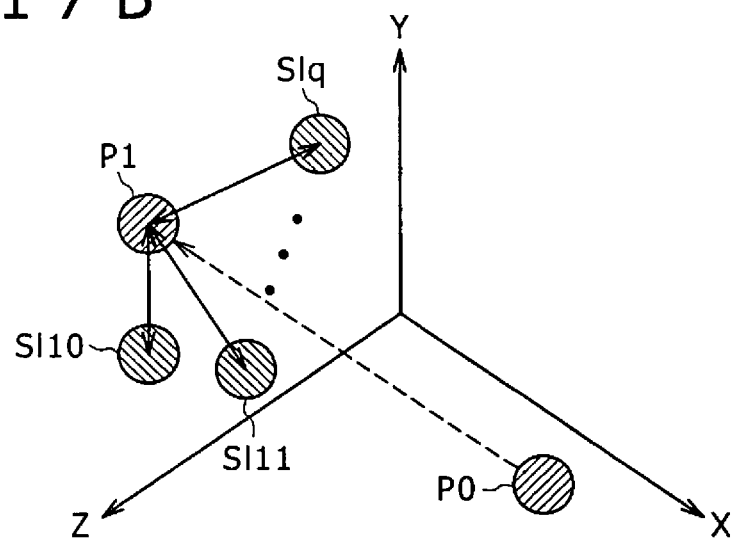

As discussed earlier with reference to FIG. 7, the above embodiment selects as many song indicators SI1 through SIm as a predetermined standard selection count within increasing distance from the developed target position P0 in the three-dimensional image TDI, discriminates as the target song that song which corresponds to the song indicator SI1 closest to the developed target position P0 from among the selected song indicators SI1 through SIm, and discriminates the songs denoted by the remaining song indicators SI2 through SIm as a plurality of candidate songs. Alternatively, as shown in FIG. 17A, it is possible to select all song indicators SI1 through SIm that exist in a spherical selection range SA10 with a radius r1 around the developed target position P0 in the three-dimensional image TDI; to discriminate as the target song that song which corresponds to the song indicator SI1 closest to the developed target position P0 from among the selected song indicators SI1 through SIm; and to discriminate the songs represented by the remaining song indicators SI2 through SIp as a plurality of candidate songs. It is also possible, as shown in FIG. 17B, for the data recording and reproducing apparatus 1 to select as many song indicators SI10 through SIq as the standard selection count within increasing distance from the target position P1 farthest (or away from the developed target position P0 by a predetermined distance) from the point of view on the line of sight passing the developed target position P0 in the three-dimensional image TDI (alternatively, all song indicators SI that exist within a spherical selection range with a predetermined radius around the target position P1 may be selected). The data recording and reproducing apparatus 1 may then be arranged to discriminate as the target song that song which corresponds to the song indicator SI10 closest to the target position P1 from among the selected song indicators SI10 through SIq, and to discriminate the songs denoted by the remaining song indicators SI11 through SI1 as a plurality of candidate songs.

Figure 18A:
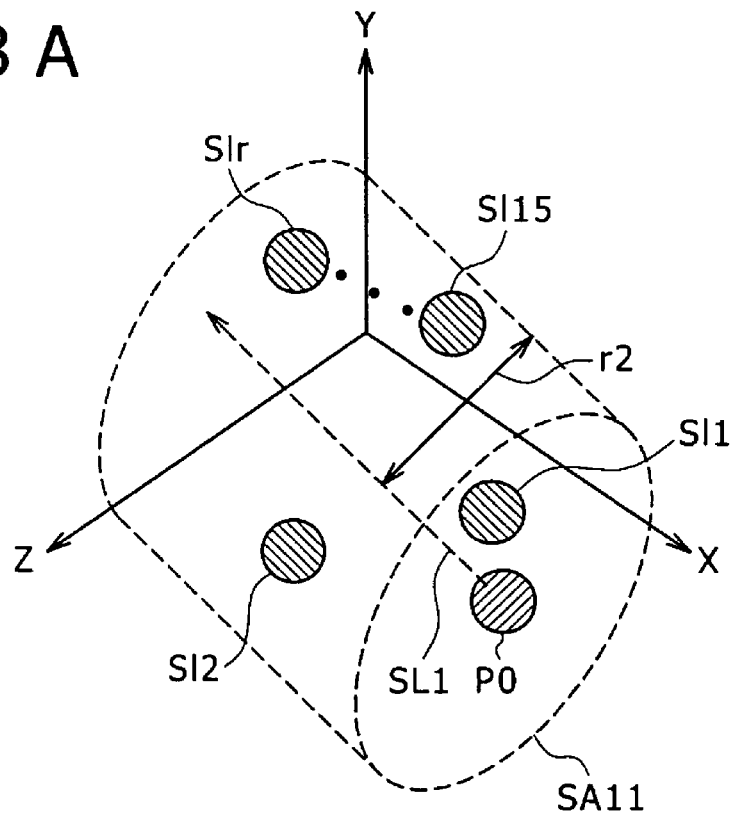
FIGS. 18A and 18B are schematic views showing how songs are selected by another alternative technique (part 2)
Figure 18B:
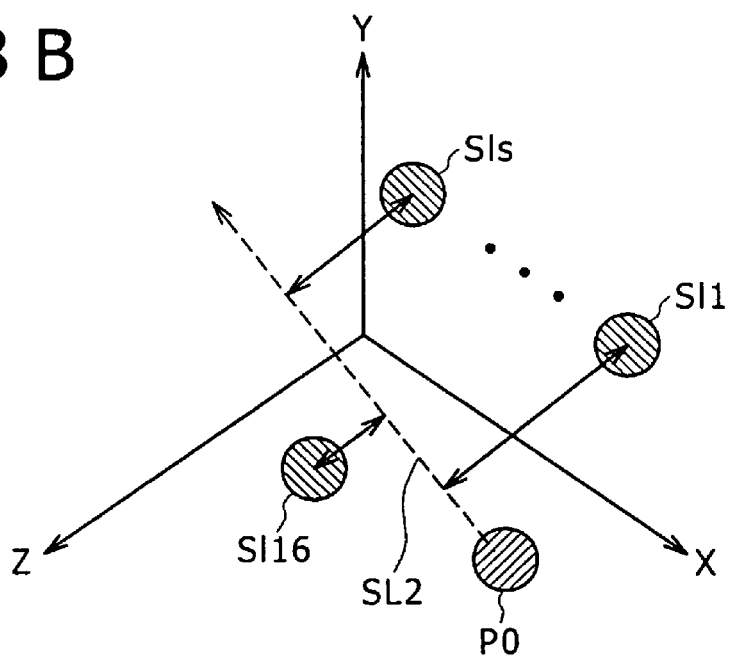
Figure 19:
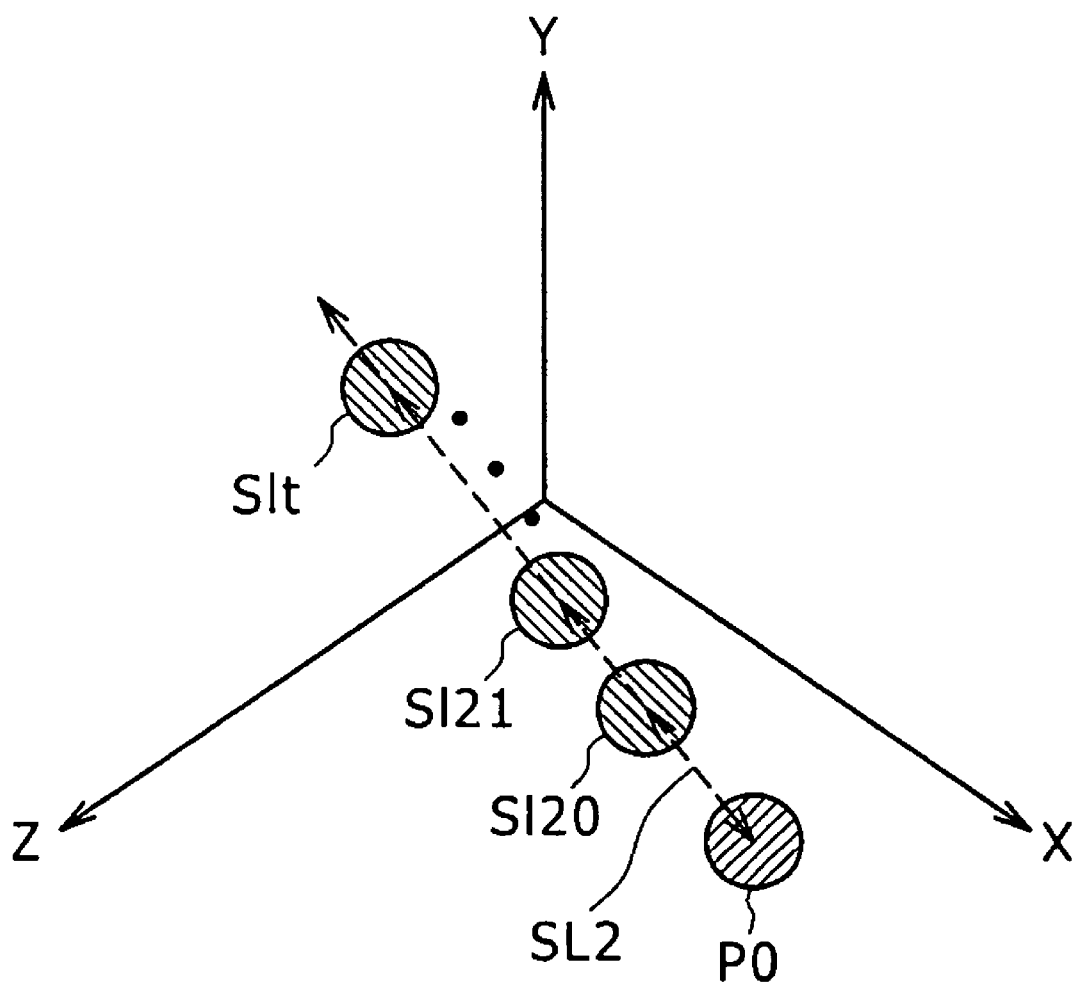
FIG. 19 is a schematic view showing how songs are selected by another alternative technique (part 3).

Furthermore, as shown in FIGS. 18A and 18B, the data recording and reproducing apparatus 1 may alternatively select all song indicators SI1 through SIr that exist in a cylindrical selection range SA11 with a radius r2 around a center axis SL1 formed by the line of sight passing the developed target position P0 in the three-dimensional image TDI, discriminate as the target song that song which corresponds to the song indicator SI2 closest to the center axis SL1 from among the selected song indicators SI1 through SIr, and discriminate the songs designated by the remaining song indicators SI1 through SIr as a plurality of candidate songs. As another alternative, the data recording and reproducing apparatus 1 may select as many song indicators SI1 through SIs as the standard selection count within increasing distance from a selection standard line SL2 formed by the line of sight passing the developed target position P0 in the three-dimensional image TDI, discriminate as the target song that song which corresponds to the song indicator SI16 closest to the selection standard line SL2 from among the selected song indicators SI through SIs, and discriminate the songs represented by the remaining song indicators SI2 through SIs as a plurality of candidate songs. As yet another alternative, as shown in FIG. 19, the data recording and reproducing apparatus 1 may select as many song indicators SI20 through SIt as the standard selection count along a selection standard line SL2 formed by the line of sight passing the developed target position P0 in the three-dimensional image TDI, discriminate as the target song that song which corresponds to the song indicator SI20 closest to the developed target position P0 from among the selected song indicators SI20 through SIt, and discriminate the songs denoted by the remaining song indicators SI21 through SIt as a plurality of candidate songs.

In the foregoing description, the data recording and reproducing apparatus 1 was shown to select a plurality of candidate songs in reference to the developed target position P0 or the target position P1 in the three-dimensional image TDI. Alternatively, it is possible to select one candidate song in reference to the developed target position P0 or the target position P1, before selecting a plurality of candidate songs in reference to the song indicator SI denoting the target song (i.e., within a selection range close to or centering on the song indicator SI in question). In this manner, the data recording and reproducing apparatus 1 can also select the songs of which at least two of the three impression items substantially match the user's preferences, i.e., songs whose impressions are closest to those favored by the user.

In the foregoing description, the data recording and reproducing apparatus 1 was shown to select the song indicators SI that exist within a circular selection range (any of SA1 through SA5) centering on the developed target position in the three-dimensional image TDI and to discriminate the songs corresponding to the selected song indicators SI as the target song and a plurality of candidate songs. Alternatively, the data recording and reproducing apparatus 1 may be arranged to select the song indicators SI within a selection range centering on the developed target position P0 in the form of one of diverse circular shapes in parallel with the X-Y plane, Y-Z plane, or Z-X plane in the three-dimensional image TDI and to discriminate the songs corresponding to the selected song indicators SI as the target song and a plurality of candidate songs. As another alternative, the data recording and reproducing apparatus 1 may discriminate the target song and a plurality of candidate songs in reference to the position of a target part on the song selection image SDI in two-dimensional form.

As discussed earlier with reference to FIG. 7, the embodiment above was shown to select as many song indicators SI1 through SIm as a predetermined standard selection count within increasing distance from the developed target position P0 in the three-dimensional image TDI, discriminate as the target song that song which corresponds to the song indicator SI1 closest to the developed target position P0 from among the selected song indicators SI1 through SIm, and discriminate the songs denoted by the remaining song indicators SI2 through SIm as a plurality of candidate songs. Alternatively, it is possible to discriminate as the target song solely that song which corresponds to the song indicator SI closest to the developed target position P0 in the three-dimensional image TDI (i.e., without discriminating any candidate songs). As another alternative, it is also possible to select a plurality of song indicators SI in reference to the developed target position P0 and to discriminate the songs corresponding to the selected song indicators SI as all target songs.

In the foregoing description, the embodiment was shown to let the user select any one point on the song selection image SDI as the target part. Alternatively, the embodiment may be arranged to let the user select as the target part an area of a particular shape (e.g., circle) on the song selection image SDI. Where the user draws a desired frame such as a circle, an ellipse, or a rectangle by moving the cursor Cu on the song selection image SDI, the data recording and reproducing apparatus 1 may be arranged to select the song indicators SI that exist within the frame thus drawn and discriminate the songs corresponding to the selected song indicators SI as all target songs. After discriminating a plurality of candidate songs in the user-drawn frame, the data recording and reproducing apparatus 1 may create a play list in which the multiple candidate songs are all registered. In this manner, the data recording and reproducing apparatus 1 enables the user freely to select the songs of the impressions meeting his or her preferences before having the songs registered in the play list.

In the foregoing description, the embodiment was shown to analyze a plurality of song data items recorded on the hard disk drive 16 so as to express in numerical form each of three items representing the impressions of the songs constituted by the song data, thereby acquiring the first, the second, and the third impression item values SP, EL, and NE representing speed, tone, and age about each song. Alternatively, the three items may be formed by some other items such as tempo, melody (e.g., cheerfulness), and mood (e.g., crispness) which are turned into numerical form to constitute the first, the second, and the third impression values of each song.

In the foregoing description, the data recording and reproducing apparatus 1 was shown to generate the song selection image SDI for use in the reproduction of songs by the apparatus 1. Alternatively, a song delivery server on the network NT may create song selection image data making up the song selection image SDI and deliver the created data to the data recording and reproducing apparatus 1. Upon receipt of a request to change the point of view from the data recording and reproducing apparatus 1, the song delivery server may update the song selection image SDI accordingly and return the updated song selection image data to the apparatus 1. In turn, the data recording and reproducing apparatus 1 may use the song selection image SDI constituted by the returned song selection image data to create a song delivery list by which to acquire (i.e., download) desired songs, or to create a play list by which to have preferred songs reproduced by external equipment attached to the apparatus 1. The data recording and reproducing apparatus 1 may alternatively acquire three-dimensional image data constituting the three-dimensional image TDI from an external entity such as the song delivery server and transform the acquired three-dimensional image TDI into the song selection image SDI.

In the foregoing description, the embodiment was shown to execute the song selection procedure RT1 (discussed in reference to FIG. 15) in accordance with the song selection program preinstalled in the ROM 12. Alternatively, a program storage medium retaining an appropriately structured song selection program may be loaded into the data recording and reproducing apparatus 1 and the program may be installed from the medium into the apparatus to carry out the song selection procedure RT1.

In the foregoing description, an embodiment of the present invention was shown to be practiced as the data recording and reproducing apparatus 1 discussed with reference to FIGS. 1 through 19 and serving as the inventive content selecting apparatus. Alternatively, an embodiment of the invention may be implemented as a content selecting apparatus for use with diverse kinds of equipment including information processing apparatuses such as computers, mobile phones, PDA (Personal Digital Assistants), and video game consoles; as well as recording and reproducing apparatuses such as video cameras, digital still cameras, DVD (Digital Versatile Disk) recorders, and hard disk recorders.

In the foregoing description, the contents to be handled were shown to be songs as discussed with reference to FIGS. 1 through 19. Alternatively, an embodiment of the present invention can deal with other diverse contents just as effectively, including photos, moving pictures such as movies, and video game programs.

In the foregoing description, the CPU 10 described with reference to FIGS. 1 through 19 was shown to act as an image transformation device which turns into numerical form three items representing the impressions of each of the contents involved so as to acquire the first, the second, and the third impression item values SP, EL, and NE constituting three-dimensional coordinates that denote song indicators indicative of the contents in a three-dimensional image, the image transforming device further transforming the three-dimensional image into a content selection image in two-dimensional form as viewed from a given point of view. Alternatively, these workings of the image transformation device may be taken over by any one of suitably structured image transforming apparatuses such as a hardware-based image transformation circuit according to an embodiment of the present invention.

In the foregoing description, an embodiment of the present invention was shown to be practiced with the operation keys 14 (discussed with reference to FIGS. 1 through 19) implemented as part of the embodiment acting as a selection device that allows the user to select a target part on a content selection image displayed on the display device. Alternatively, an embodiment of the present invention may be practiced using any one of diverse selection devices including pointing devices such as the mouse.

In the foregoing description, the CPU 10 described with reference to FIGS. 1 through 19 was shown to act as a discrimination device which discriminates the target content selected from a plurality of contents in accordance with the position of the target part selected as desired through the selection device on the content selection image and in keeping with the positions of a plurality of content indicators indicative of the contents on the image. Alternatively, these workings of the discrimination device may be taken over by any one of suitably structured discrimination devices such as a hardware-based selection circuit according to an embodiment of the invention.

As described, an embodiment of the present invention may be applied advantageously to a data recording and reproducing apparatus and to a content selecting apparatus such as a song delivery server or a personal computer.

It should be understood by those skilled in the art that various modifications, combinations, sub-combinations and alterations may occur depending on design requirements and other factor in so far as they are within the scope of the appended claims or the equivalents thereof.

The invention claimed is:

1. A content selecting method for allowing a target content to be selected as desired from a plurality of contents, the content selecting method comprising:

transforming a three-dimensional image into a content selection image made up of a two-dimensional image viewed from a predetermined point of view, the three-dimensional image including content indicators each representing one of a plurality of contents, each of the content indicators being designated by a plurality of three-dimensional coordinates made of first, second, and third impression item values obtained by converting three items representative of impressions of each content into numerical terms, in which each of the three items is different from each other such that a first item thereof is different from a second item thereof which is different from a third item thereof;

displaying the content selection image; and discriminating target content selected from the plurality of contents in accordance with the position of a selected target part on the content selection image and with the positions of the plurality of content indicators on the content selection image, in which respective content represents a respective song, and in which the first item represents a speed of the respective song, the second item represents a tone of the respective song in which the tone indicates whether the respective song is analog or digital, and the third item represents an age of the respective song.

2. The content selecting method according to claim 1, wherein, if a command is given to change the point of view by rotating the three-dimensional image, the image transforming step transforms the three-dimensional image into a content selection image viewed from the changed point of view.

3. The content selecting method according to claim 2, wherein the image transforming step transforms the three-dimensional image, along with three axes which intersect perpendicularly to one another and which constitute a standard for forming the three-dimensional image, into the content selection image made up of the two-dimensional image viewed from the changed point of view.

4. The content selecting method according to claim 1, wherein the discriminating step discriminates the selected target content in accordance with distances between the position of the target content and the positions of the content indicators.

5. The content selecting method according to claim 1, wherein the discriminating step discriminates as candidate contents those contents corresponding to the content indicators located within a predetermined distance of the content indicator representing the target content.

6. The content selecting method according to claim 5, further comprising creating a reproduction list by which to reproduce the target content and the candidate contents successively.

7. The content selecting method according to claim 1, wherein the discriminating step discriminates as candidate contents those contents corresponding to a predetermined number of content indicators within an increasing distance from the content indicator representing the target content.

8. The content selecting method according to claim 7, further comprising creating a reproduction list by which to reproduce the target content and the candidate contents successively.

9. The content selecting method according to claim 1, wherein, in accordance with a frame representing the selected target part and with the positions of the plurality of the content indicators on the content selection image, the discriminating step discriminates as target contents a plurality of the contents which correspond to a plurality of the content indicators found inside the frame on the content selection image, the method further comprising:

creating a reproduction list by which to reproduce a plurality of the target contents successively.

10. The content selecting method according to claim 1, wherein the displaying step displays the content selection image in an enlarged and a reduced form in accordance with commands to enlarge and reduce the content selection image, respectively.

11. The content selecting method according to claim 1, further comprising creating a three-dimensional image including the content indicators designated by the plurality of three-dimensional coordinates made of the first, the second, and the third impression item values.

12. The content selecting method according to claim 1, further comprising:

receiving three-dimensional image data forming the three-dimensional image through communication with an external entity;

creating a reproduction list by which to reproduce the target content and candidate contents successively, the candidate contents corresponding to content indicators located near the content indicator representing the target content on the content selection image; and transmitting reproduction list data forming the reproduction list through communication with the external entity.

13. The content selecting method according to claim 1, wherein the discriminating step displays on the content selection image the content indicator representing the target content in a color different from the color in which the other content indicators are displayed.

14. A content selecting method for allowing a target content to be selected as desired from a plurality of contents, the content selecting method comprising:

transforming a three-dimensional image into a content selection image made up of a two-dimensional image viewed from a predetermined point of view, the three-dimensional image including content indicators each representing one of a plurality of contents, each of the content indicators being designated by a plurality of three-dimensional coordinates made of first, second, and third impression item values obtained by converting three items representative of impressions of each content into numerical terms;

displaying the content selection image; and discriminating target content selected from the plurality of contents in accordance with the position of a selected target part on the content selection image and with the positions of the plurality of content indicators on the content selection image, wherein the discriminating step displays on the content selection image the content indicator representing the target content in a color different from the color in which the other content indicators are displayed, and wherein the discriminating step includes:

discriminating as candidate contents those contents corresponding to the content indicators located near the content indicator representing the target content on the content selection image; and displaying the content indicators denoting the candidate contents in a color different from the color in which the content indicator representing the target content is displayed and different from the color in which the content indicators located around the content indicators denoting the candidate contents are displayed.

15. A content selecting apparatus for allowing a target content to be selected as desired from a plurality of contents, the content selecting apparatus comprising:

an image transformation device configured to transform a three-dimensional image into a content selection image made up of a two-dimensional image viewed from a predetermined point of view, the three-dimensional image including content indicators each representing one of a plurality of contents, each of the content indicators being designated by a plurality of three-dimensional coordinates made of first, second and third impression item values obtained by converting three items representative of impressions of each content into numerical terms, in which each of the three items is different from each other such that a first item thereof is different from a second item thereof which is different from a third item thereof;

a display device configured to display the content selection image;

a selection device configured to let a target part be selected from the content selection image displayed on the display device; and a discrimination device configured to discriminate a target content selected from the plurality of contents in accordance with the position of the selected target part on the content selection image and with the positions of the plurality of content indicators on the content selection image, in which a respective content represents a respective song, and in which first item represents a speed of the respective song, the second item represents a tone of the respective song in which the tone indicates whether the respective song analog or digital, and the third item represents an age of respective give song.

* * * * *